Oct. 11, 1949.　　　　　G. DEAKIN　　　　　2,484,080
TELECOMMUNICATION SYSTEM
Filed Feb. 5, 1944　　　　　　　　　　　　　18 Sheets-Sheet 9

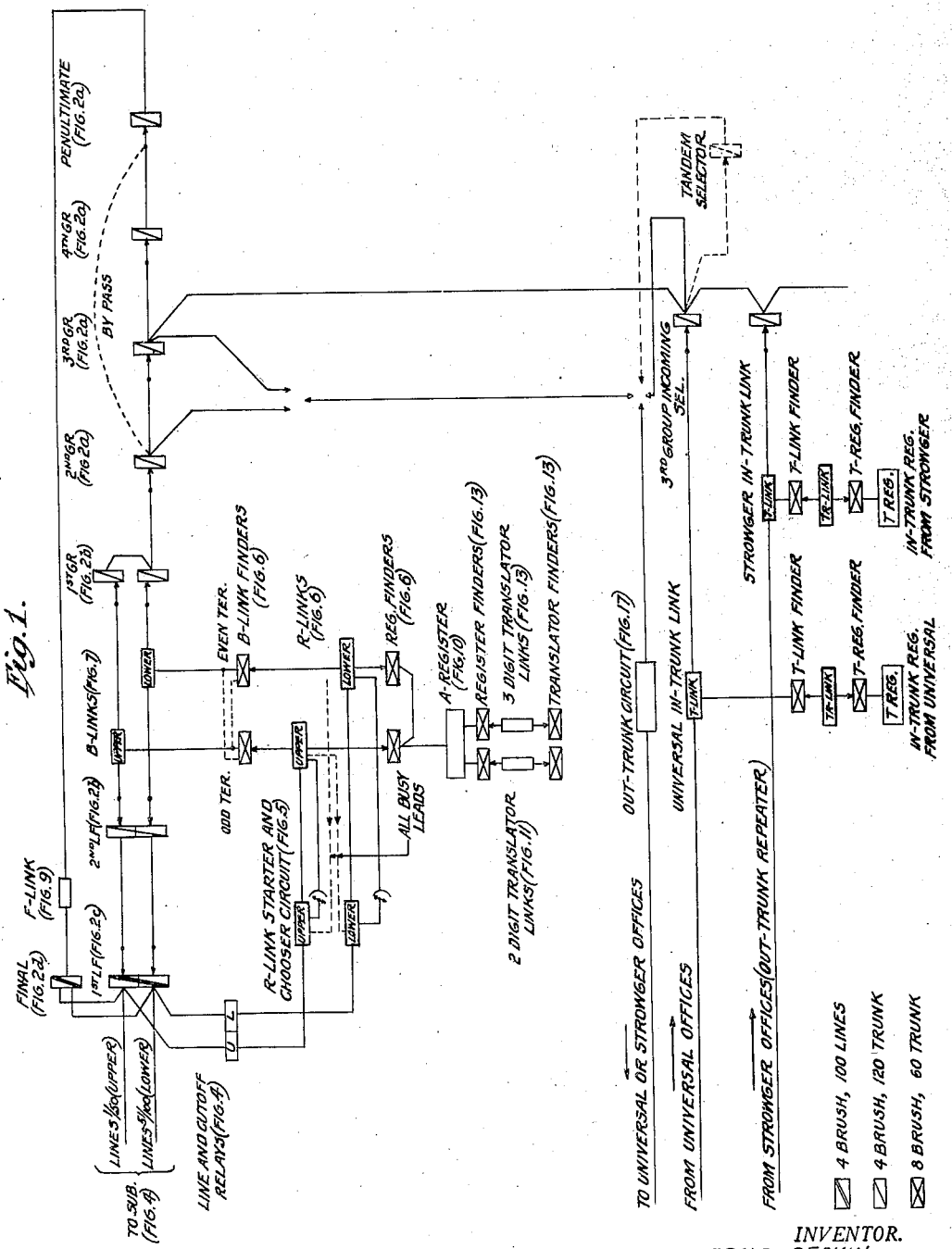

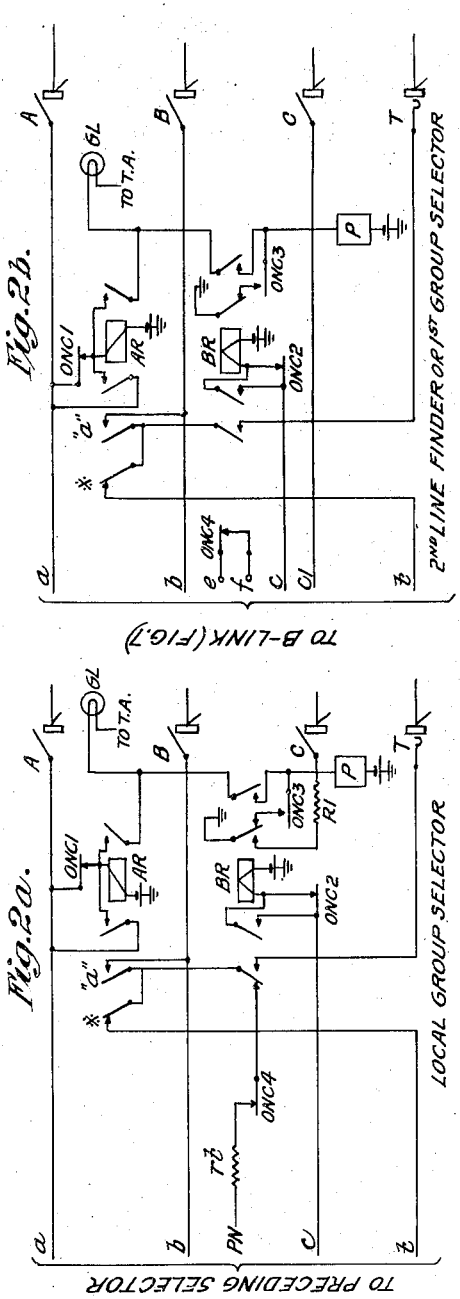
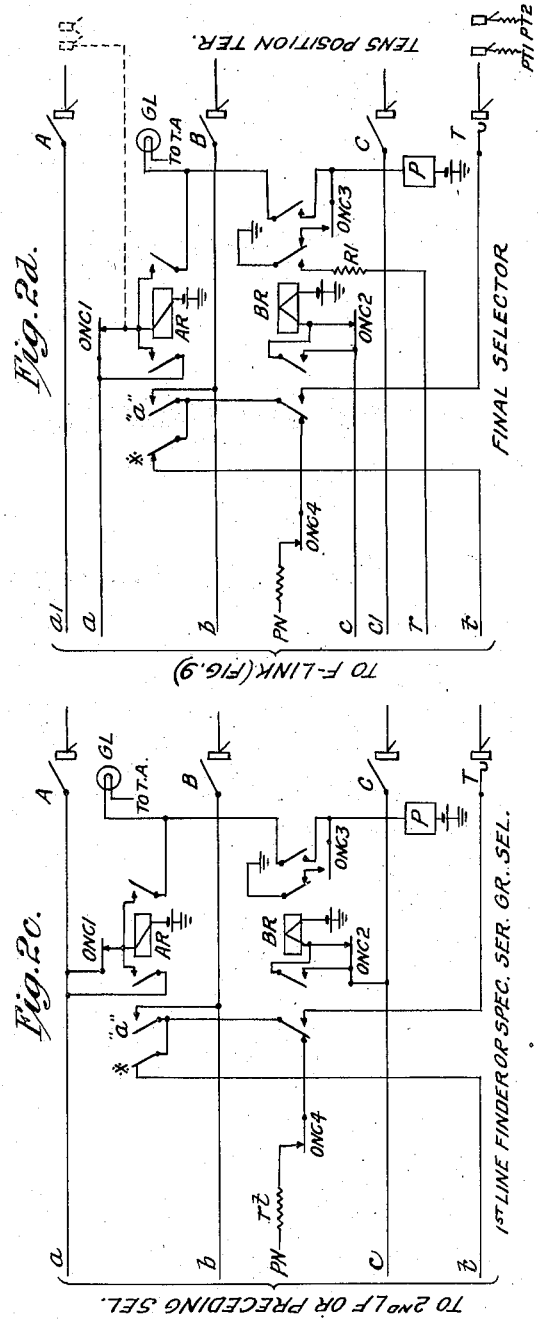

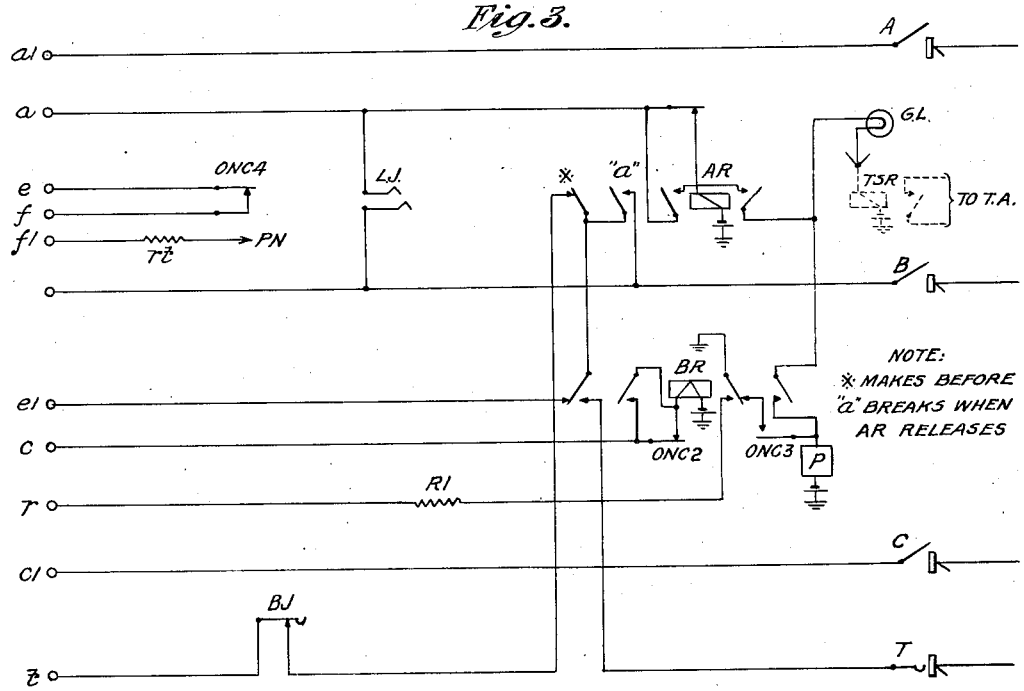
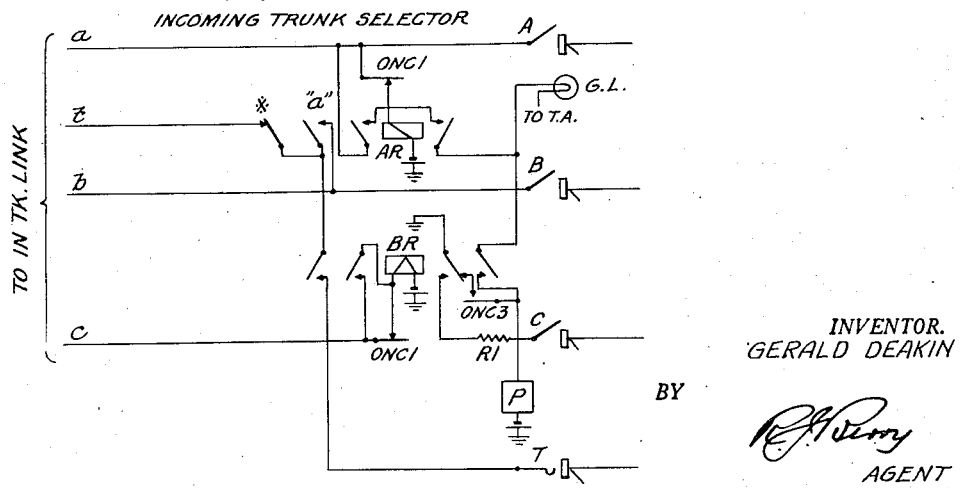

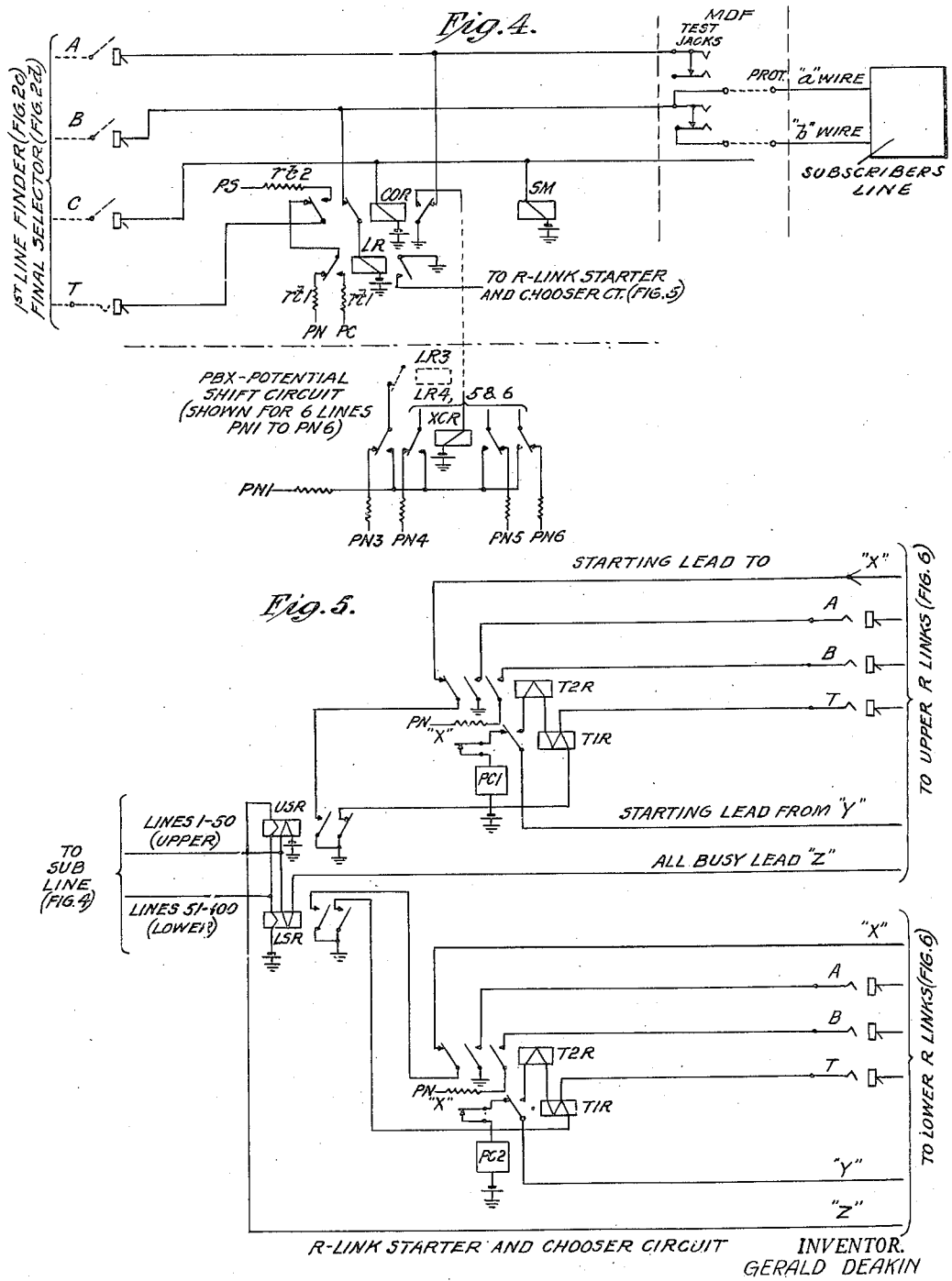

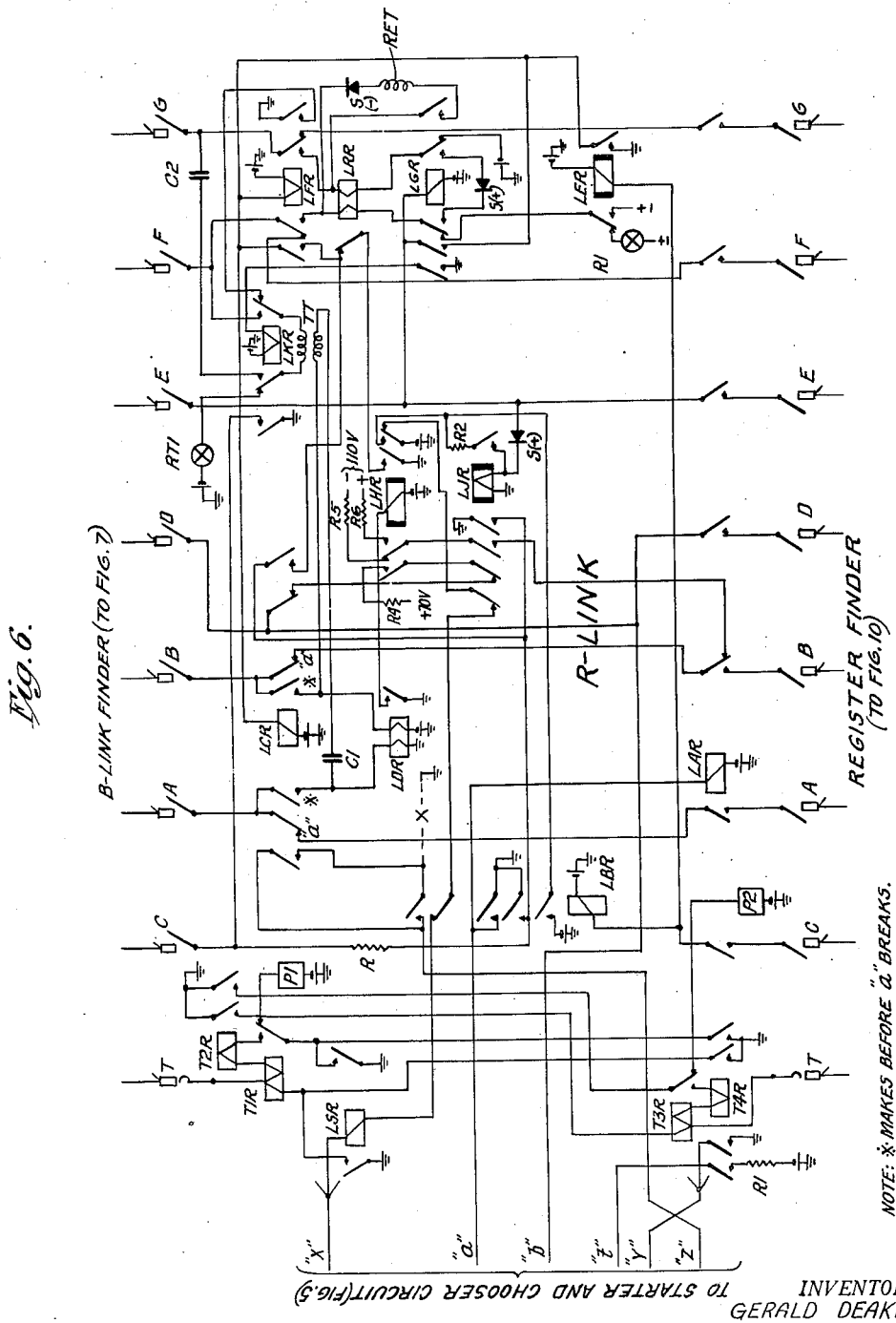

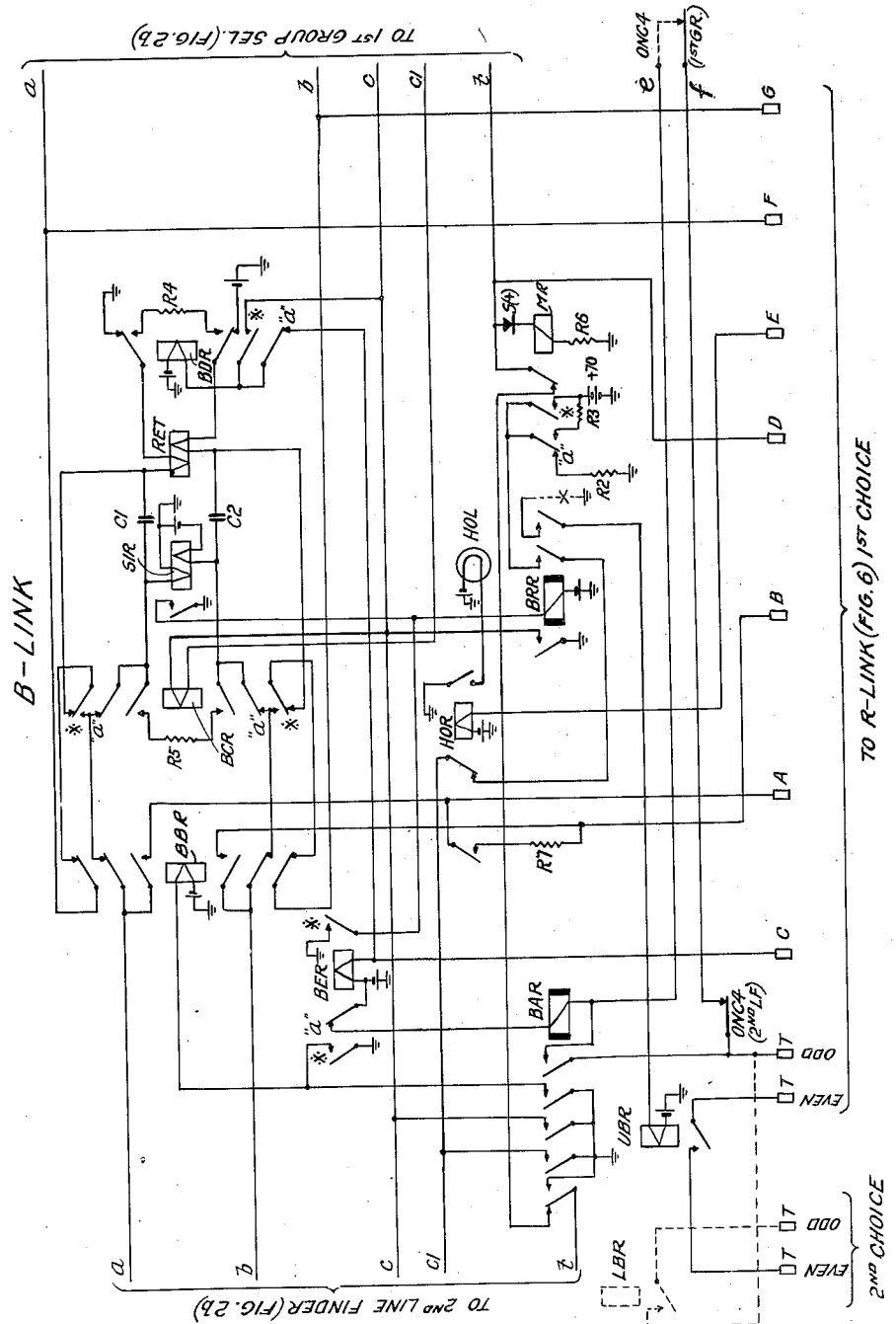

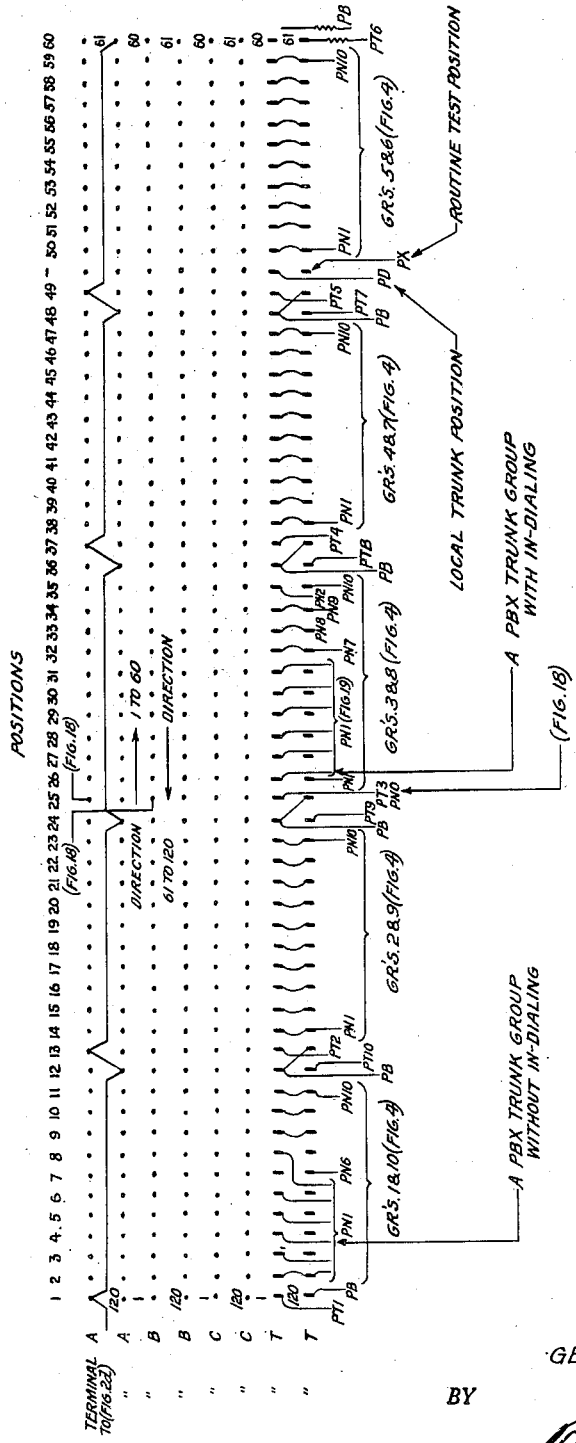

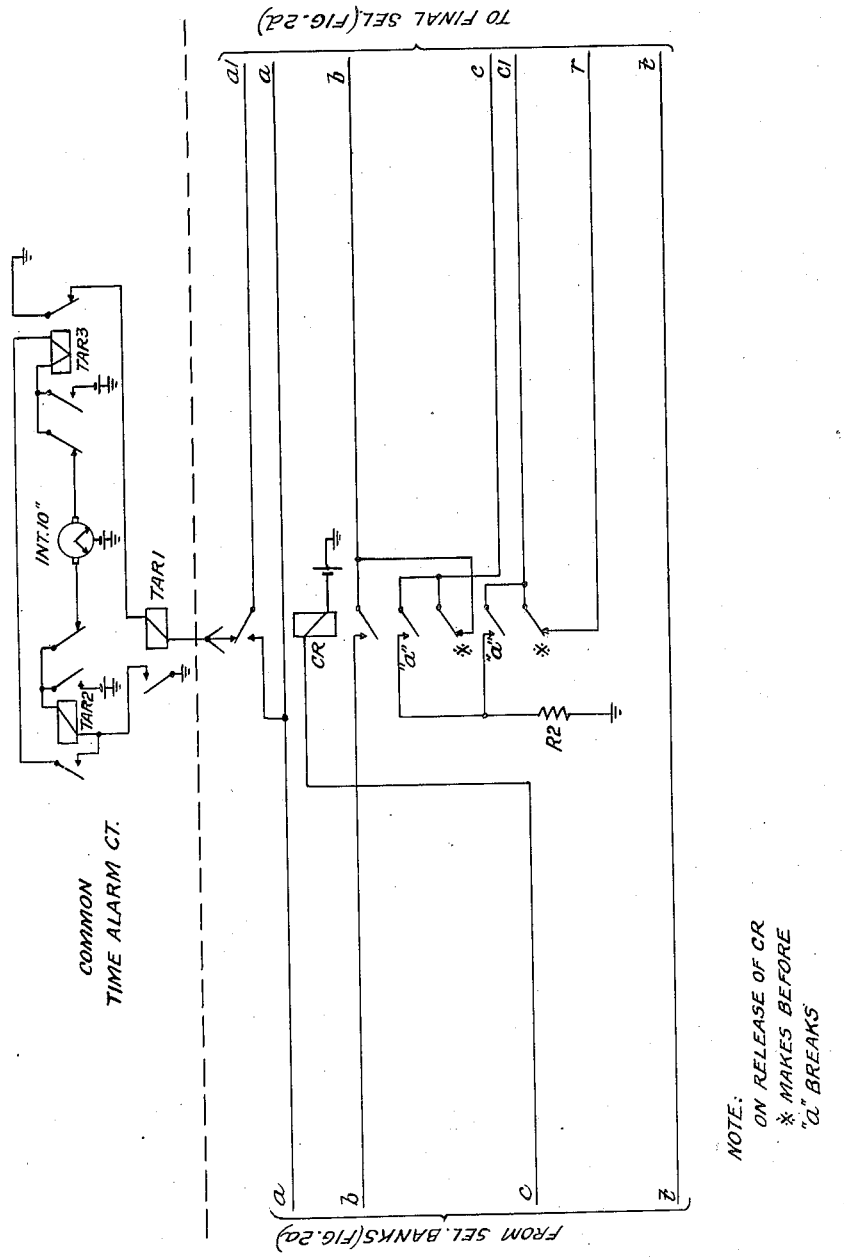

REGISTER

INVENTOR.
GERALD DEAKIN

BY

AGENT

Oct. 11, 1949.　　　　　　G. DEAKIN　　　　　　2,484,080
TELECOMMUNICATION SYSTEM
Filed Feb. 5, 1944　　　　　　　　　　　　　18 Sheets-Sheet 10

INVENTOR.
GERALD DEAKIN
BY
AGENT

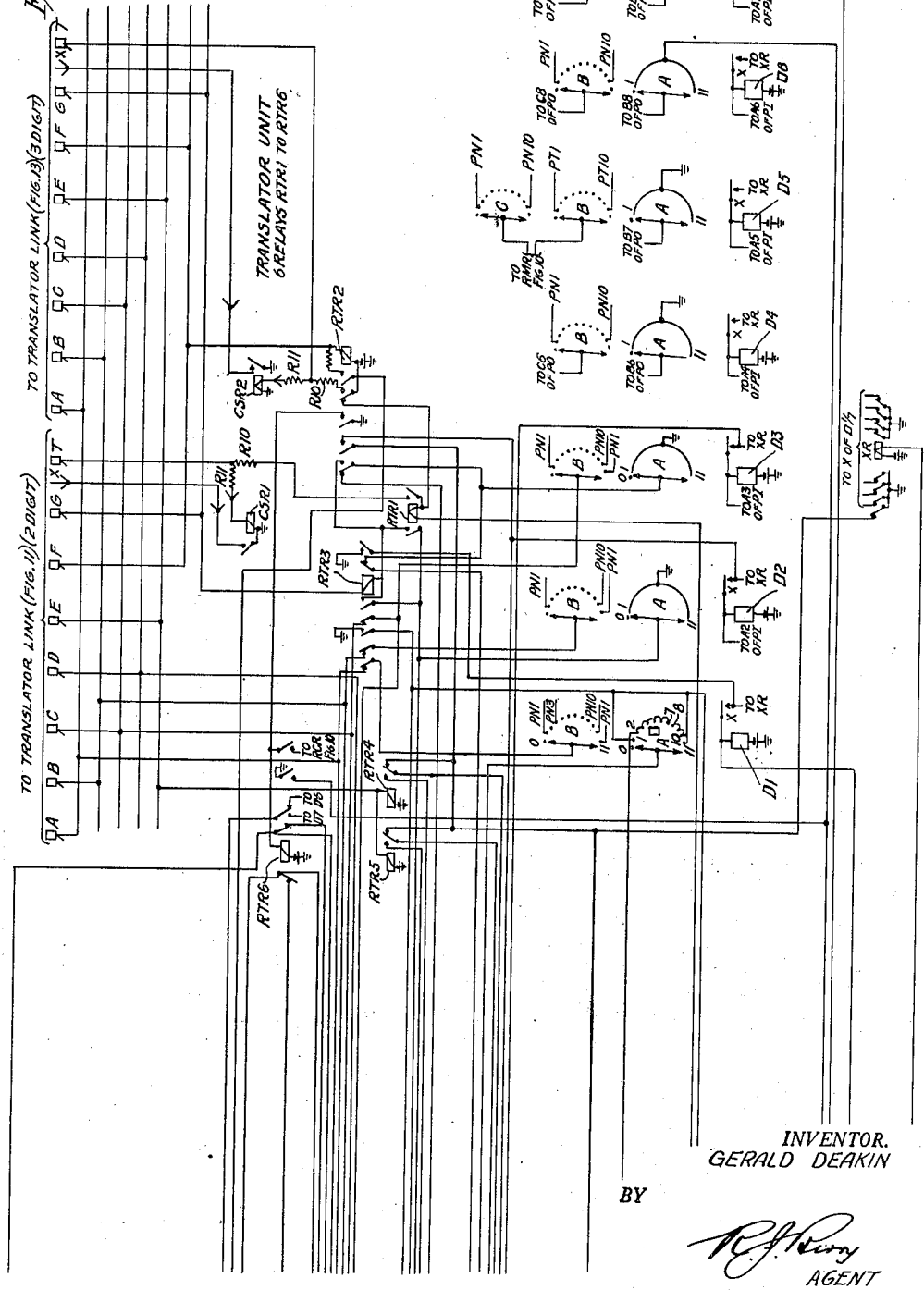

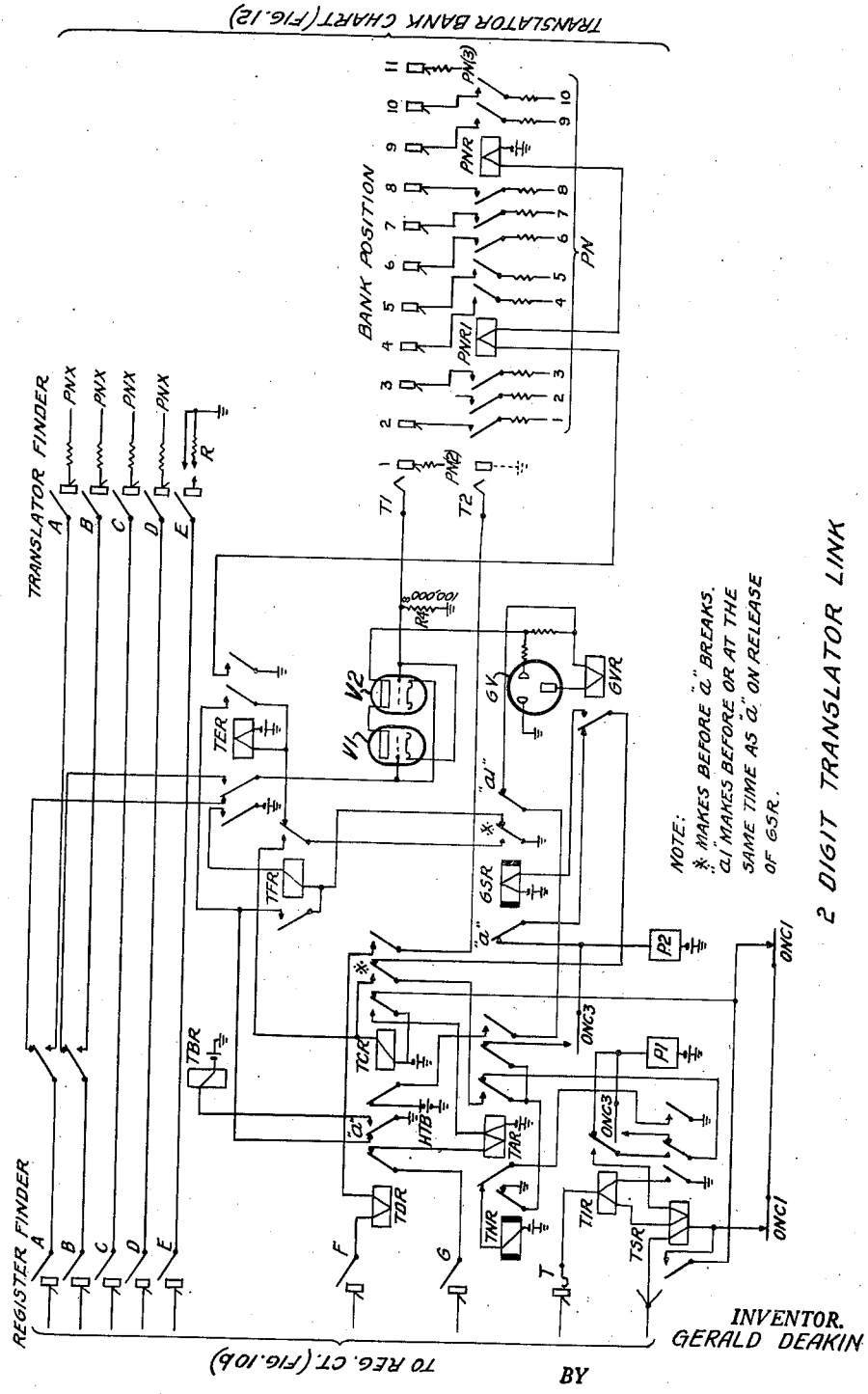

Oct. 11, 1949.                G. DEAKIN                2,484,080
                        TELECOMMUNICATION SYSTEM
Filed Feb. 5, 1944                                    18 Sheets-Sheet 13

INVENTOR.
GERALD DEAKIN
BY
AGENT

Oct. 11, 1949.                    G. DEAKIN                       2,484,080
                          TELECOMMUNICATION SYSTEM
Filed Feb. 5, 1944                                          18 Sheets-Sheet 14

INVENTOR.
GERALD DEAKIN
BY
AGENT

Oct. 11, 1949.　　　　G. DEAKIN　　　　2,484,080
TELECOMMUNICATION SYSTEM
Filed Feb. 5, 1944　　　　　　　　　　18 Sheets-Sheet 17

FINAL SELECTOR BANK
TENS POSITION

NOTE:
POS. 3,5 & 8
WIRED FOR PBX
IN-DIALING

INVENTOR.
GERALD DEAKIN
BY
AGENT

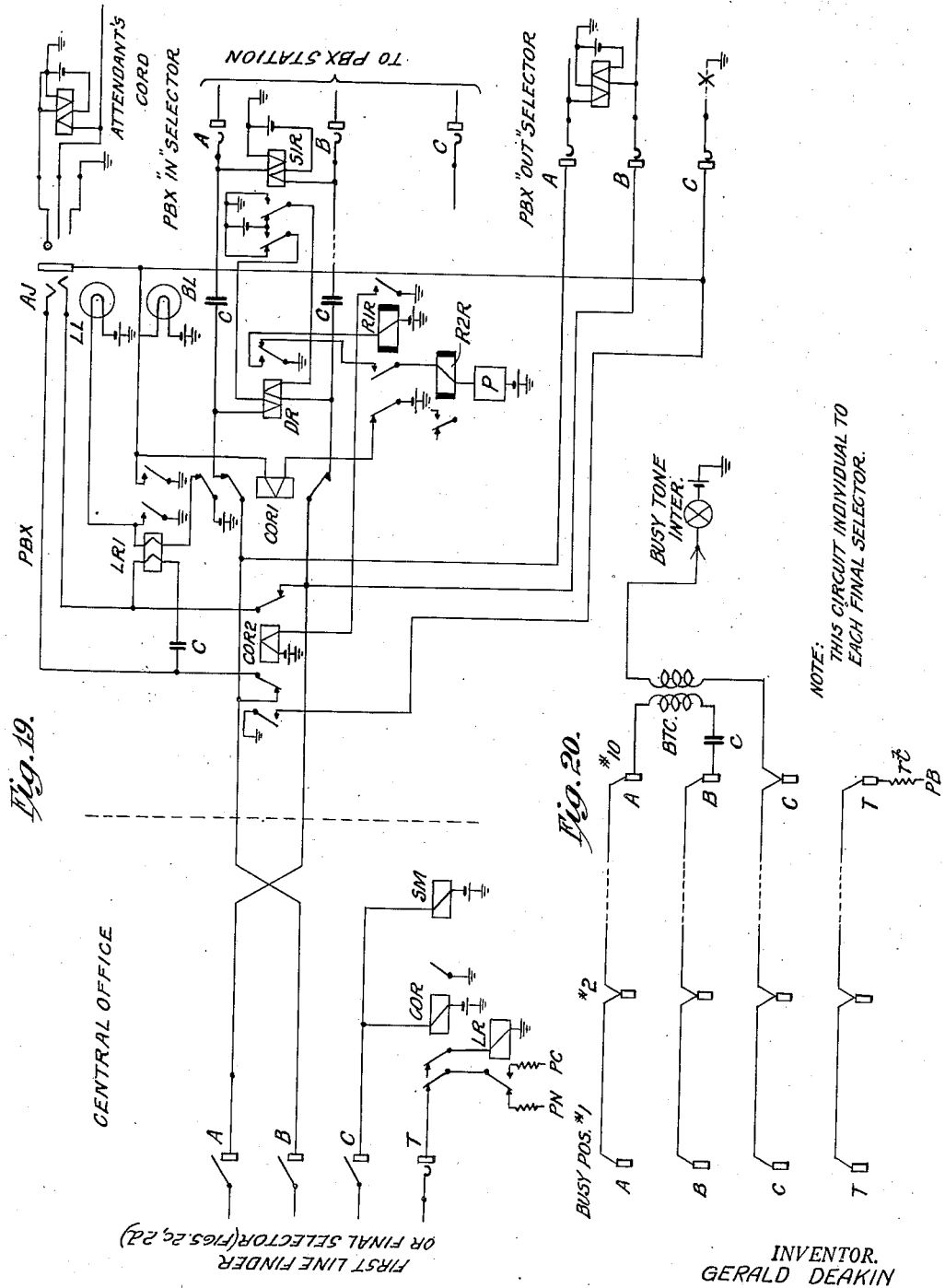

Patented Oct. 11, 1949

2,484,080

UNITED STATES PATENT OFFICE 2,484,080

TELECOMMUNICATION SYSTEM

Gerald Deakin, New York, N. Y., assignor to International Standard Electric Corporation, New York, N. Y., a corporation of Delaware Application February 5, 1944, Serial No. 521,160

19 Claims. (Cl. 179—18)

This invention relates to new and useful improvements in automatic telephone systems.

The object of the invention is to simplify the circuits of automatic telephone switches which are used in the establishment of connections and to make the switching arrangement more flexible and more readily adapted for the requirements of inter-office and intra-office connections than was heretofore practicable.

According to one of the features of the invention all the numerical and non-numerical switches through which the calling and called subscribers are connected, are identical. Preferably, each switch has only a set of wipers and a bank of terminals and the cooperation of the switch is controlled by a magnet and two relays.

In the system here disclosed first and second line finders, a variable number of group selectors and a final selector is used in the establishment of a connection. In addition to the two-relay and one-magnet switches, the connection between a calling and a called line contains only two switching means: a group of relays between the second line finder and the first selector—a so-called B-link to effect the customary supervisory control and to connect a register with the system, and a single relay—a so-called F-link between the penultimate and final selectors to hold the latter until the called subscriber hangs up.

In order to permit by-passing of certain selecting stages and re-routing calls, as well as for performing other operations in which the numerical selection is different from, though controlled by the register, according to another feature of the present invention a digit translator may be automatically connected with any one of a plurality of registers. Once its function is performed, the translator is used to control the establishment of another connection. The register and translator are arranged to take care of called numbers consisting of different numbers of digits, for instance of numbers in which the office prefix has two or three digits.

Any group selector may be used for the establishment of local or inter-office incoming connections. Tandem trunking may be practiced from any level of any selector, and from any one of the group selectors, or even from the final selector, as is the case in called to a P. A. X.

The register controls the operation of both the numerical and the non-numerical switches used in the establishment of a connection. Thus the same type of switch may be used either as a line finder or as a group selector.

Other features of the invention have to do with the grouping of subscribers' lines and the non-numerical switches used in the extension of a call, with the selection of a P. B. X trunk to attract the attention of an attendant or for the direct selection under the control of the register at the main exchange of a P. B. X subscriber, and with other features which will more clearly appear from the following description of an embodiment of the invention.

As much of a multi-office system will be described as is necessary for a clear understanding of the invention. While a telephone system of the so-called multi-potential selection type will be disclosed, it will be clear to those skilled in the art that some of the features are applicable to many other types of switching systems, whether they are used for establishing telephone connections or for any other purposes.

In the drawings:

Fig. 1 is a block diagram showing the general lay-out of the system;

Figs. 2a to 2e illustrate the various selector circuits;

Fig. 3 shows an all-purpose selector circuit which may be adjusted for various purposes in the manner indicated in Fig. 3a;

Fig. 4 shows a subscriber's line circuit;

Figure 10:
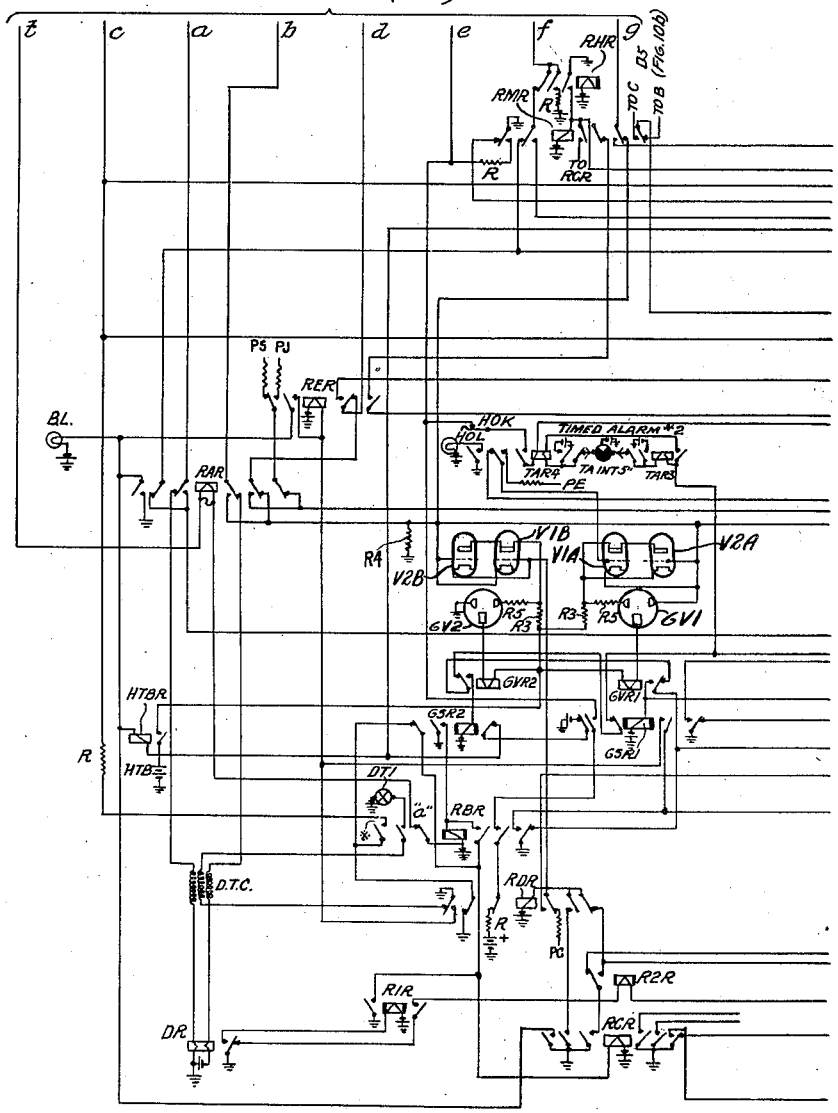
Figure 10A:
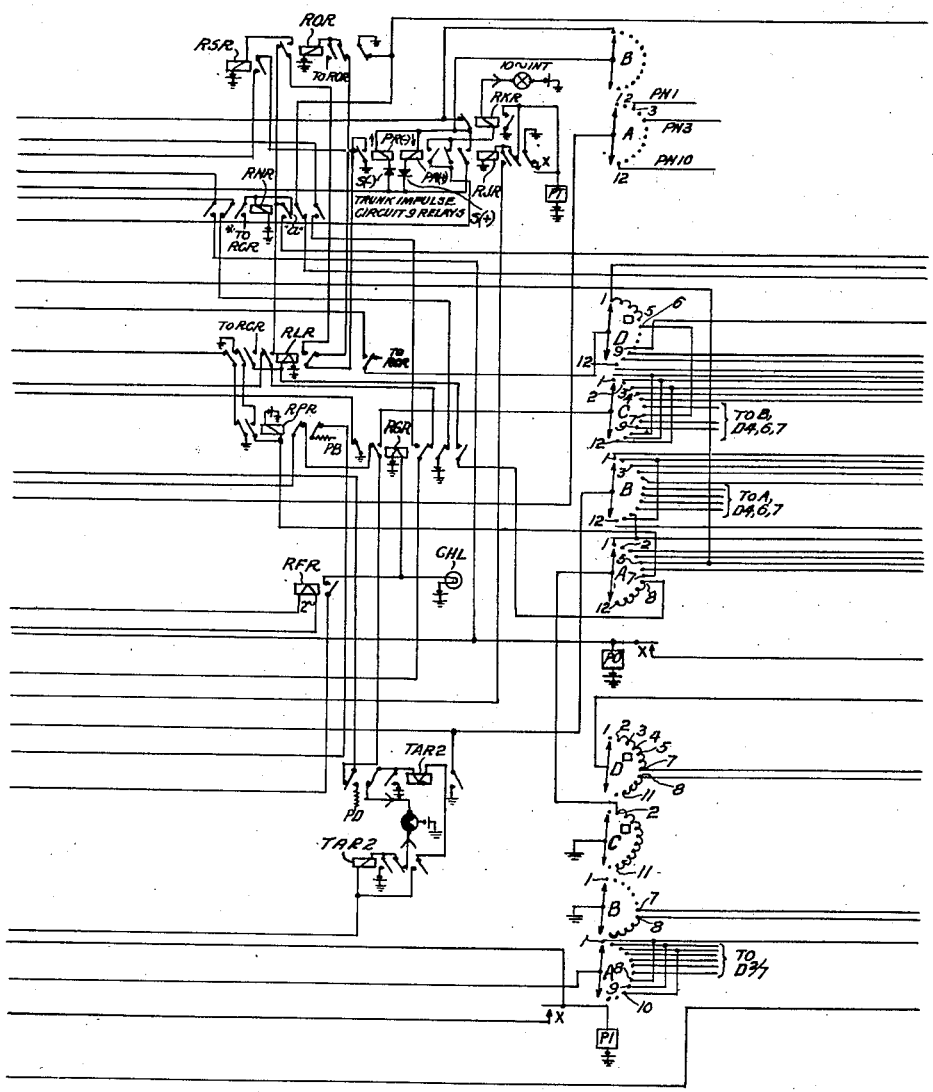
Figure 15:
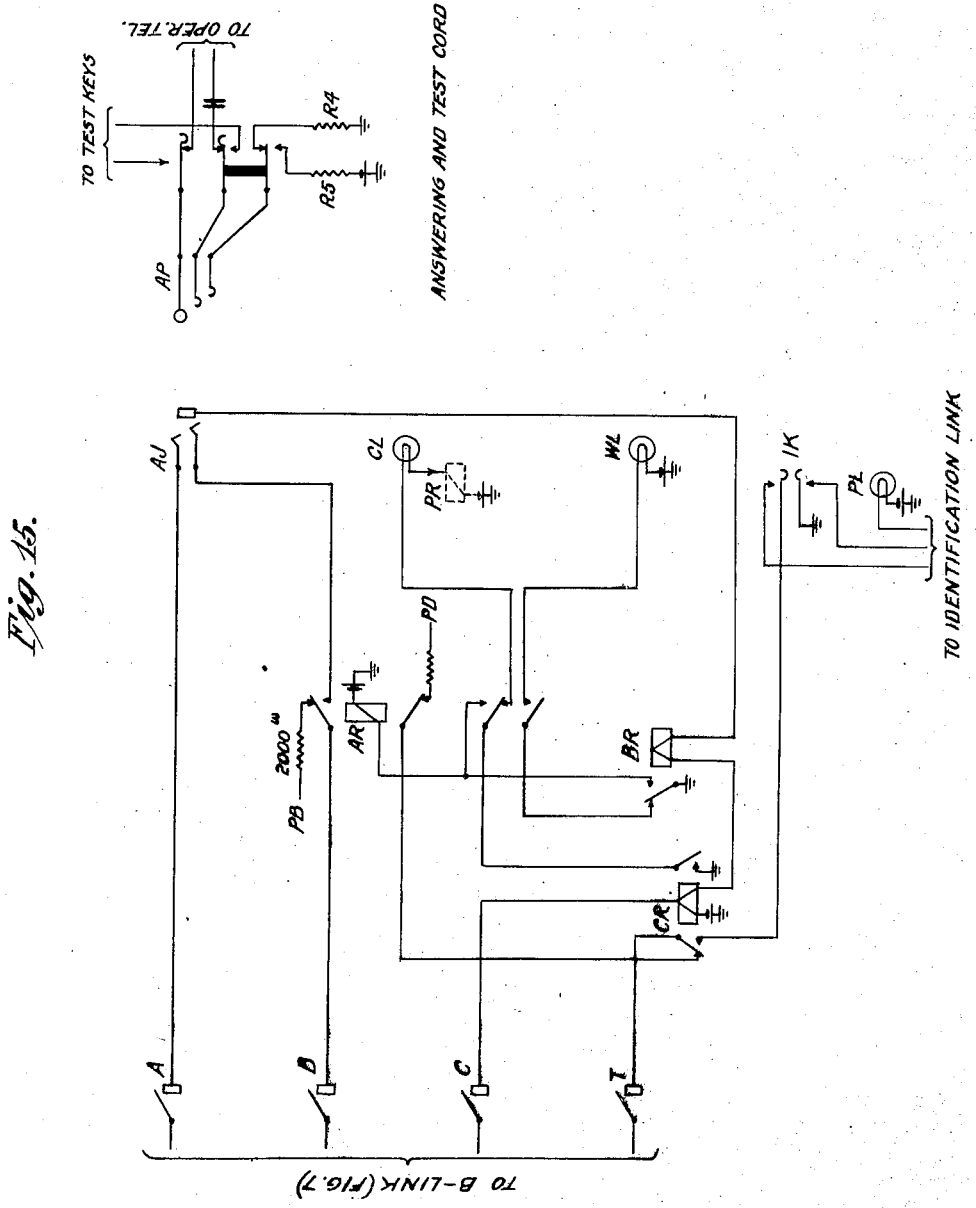
Figure 16:
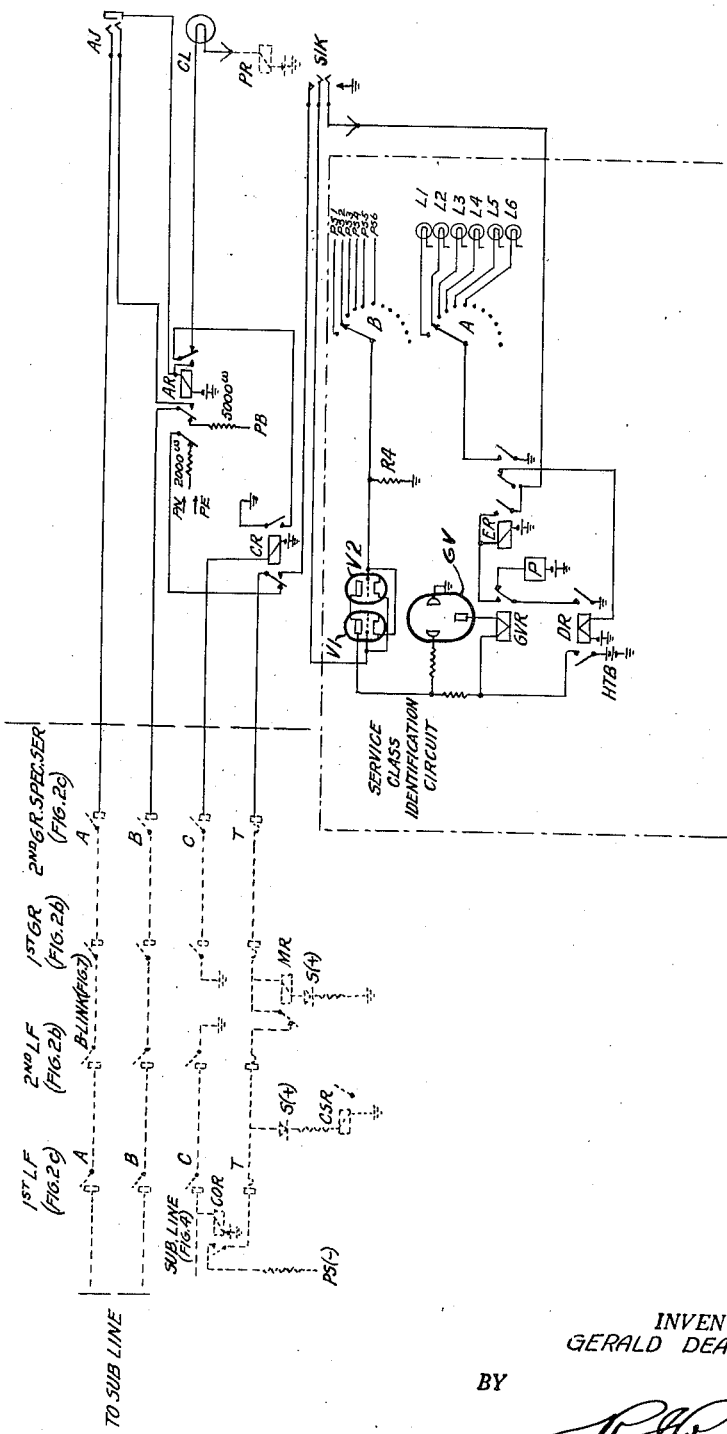
Figure 17:
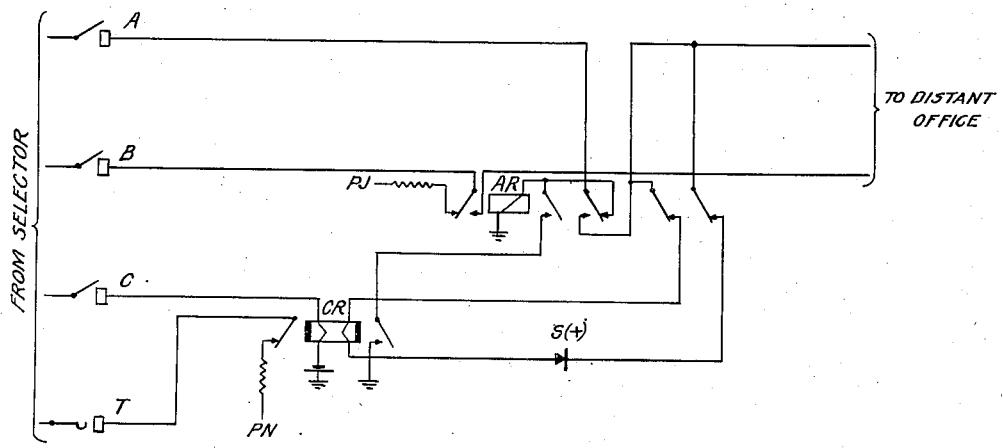
Figure 18:
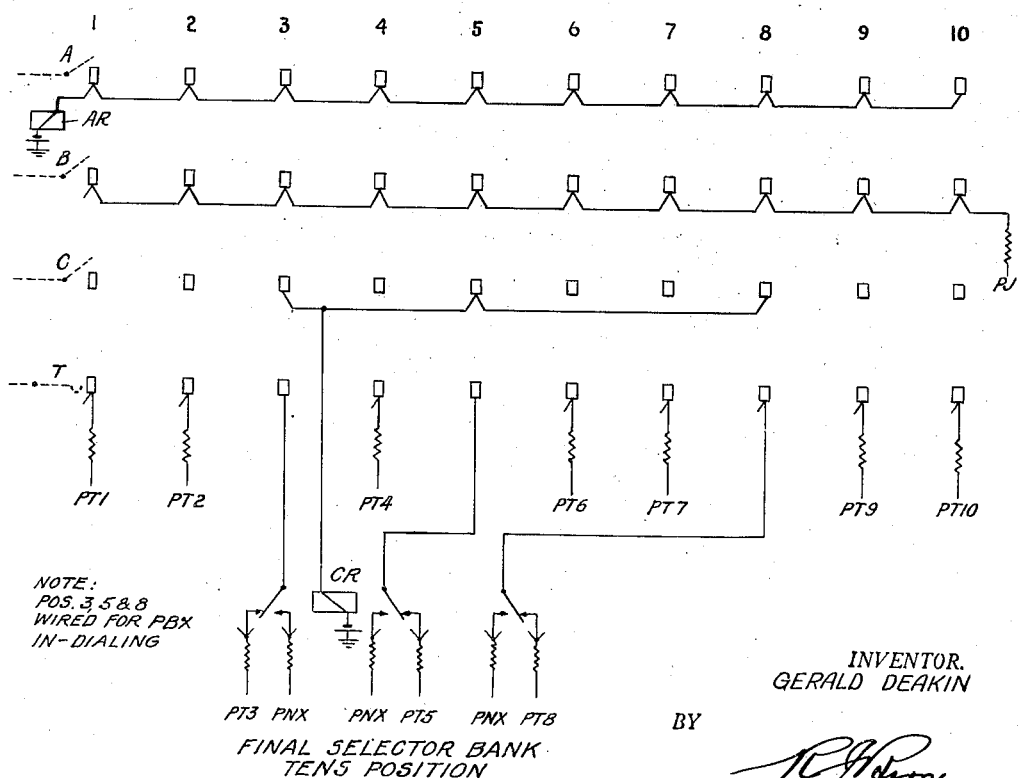

Fig. 5, an R-link start and chooser circuit;

Fig. 6, an R-link;

Fig. 7, a B-link;

Fig. 8, the terminal bank of a final selector;

Fig. 9, an F-link;

Figs. 10, 10a and 10b, a register;

Fig. 11, a two-digit translator link;

Fig. 12, a two-digit translator bank;

Fig. 13, a three-digit translator link;

Fig. 14, a three-digit translator bank;

Fig. 15, a false call trunk;

Fig. 16, a local trunk to an operator;

Fig. 17, an out-trunk circuit;

Fig. 18, the "tens" position of a final selector bank;

Fig. 19, a P. B. X trunk for in-dialing to a P. B. X; and

Fig. 20, a busy tone circuit.

The following are definitions of some of the expressions used in the specification and claims:

"Multi-potential" working or operation means a selective operation in which a numerical or non-numerical switch, such as a selector or line finder, is stopped under the control of a device, e. g. an electrical discharge tube provided in a register controller when a certain predetermined relationship exists between two potentials simultaneously applied to said device. One of said potentials is applied in accordance with the numerical or some other designation or characteristic of the line to be selected, and the other potential under the control of the numerical or non-numerical switch during its operation.

"B-link" designates a link extending between the wipers of a line finder and a first selector; "R-link" is a link by means of which a register may be associated with a B-link; "T-link" is a link by means of which an incoming trunk at an exchange is linked to the wipers of one of the group selectors; "TR-link" is a link by means of which a register is connected to a T-link; "A-register" is a register controller by means of which the establishment of calls originating within the exchange is controlled; "T-register" is a register controller by means of which a call which originated outside of the exchange is controlled within the exchange in which the T-register is located; "Final" means the final selector or connector by means of which the called line is seized.

For the sake of brevity, the words "contact" and "relay" will not be repeated when reference is made to the front or back contact of a relay. Thus "back BER" means the back contact of relay BER.

GENERAL

The selection circuit

The switching mechanism is a high speed, tube controlled, four brush selector adapted to hunt over a single unsplit bank of the type disclosed in Patent No. 2,336,471, issued December 14, 1943; and Patent No. 2,330,812, issued October 5, 1943. The unsplit bank is made possible by the multi-potential selection arrangement here used and fully described in my Patents No. 2,351,016, issued June 13, 1944 and No. 2,380,950, issued August 7, 1945; and the patent of H. F. Herbig, No. 2,354,682, issued August 1, 1944, and the applications referred to in said patents. The finders and selectors are arranged in the manner shown on the junction diagram of Fig. 1.

As distinguished from my Patent No. 2,380,950 where three types of switching selector circuits are used, in the present system, all switching selector circuits are identical. Each has two relays, AR and BR, as shown in Figs. 2a–2f, 3 and 3a. This circuit by simple strapping and, when necessary, by cutting in relay links may be used for the following purposes:

1st line finder, Fig. 2c
2nd line finder, Fig. 2b used with a B-link (Fig. 7) forms the usual connection circuit
1st group selector, Fig. 2b
Local group and penultimate selectors, Fig. 2a
Final selector, Fig. 2d used with F-link (Fig. 9)
Incoming trunk selector, Fig. 2e
Special service group selector, Fig. 2c
Tandem selector, Fig. 2e The intra-office trunks have four wires and the inter-office trunks two wires. The $a$ and $b$ wires are the talking conductors, the $c$ wire the holding wire and the $t$ wire the test wire which, during selection is used for testing but is freed after selection for miscellaneous use, such as calling line identification, multiple metering, automatic ticketing, service identification, etc. The test wire even provides the facility whereby the exchange attendant may identify the number of the calling subscriber without going to the trouble of tracing down the connection.

Register control with translation

The system is register controlled. The register in the originating office—the so-called A-register—is connected to B-links (Fig. 1) through R-links. The R-links contain the equipment for handling the requirements of ringing, busy calls, metering, coin machines and other similar functions. For large areas where translation is necessary, translator links are associated with the register. Where mixed two and three-digit prefixes are used, two and three-digit trans-office prefixes are also used. Each translator link has a register finder and translator finder. The banks of the translator finders are multipled, and one cross-connection for each office prefix suffices for all translators.

The trunks incoming from other offices (Fig. 1) terminate in groups of relays—designated as T-links—which are cross-connected to standard all purpose switching selector circuits. The registers which handle incoming calls—the so-called T-registers—are connected to the T-links through TR-links, corresponding to the R-links used with the A-registers. The possibility of cross-connecting and of using any group selector for local or incoming connections is a great convenience in a growing and changing network.

Adding translation to unsplit selector banks such as are used in the present system, greatly increases the efficiency of the trunk plan in large networks. Selections may be suppressed or by-passed, for example, from the second group selectors to the penultimate selector for handling heavy local traffic. This is indicated by dotted lines in Fig. 1. Trunks may be routed in any convenient manner and not according to a fixed numerical designation as is necessary in systems without translation. Additional selections may be introduced to provide for large group concentrations for the more economical use of long and important loaded trunks, etc.

The translator controls the re-routing of calls and is automatically connected with the register depending on the number dialed. After it had performed its function, the translator is disconnected from the register.

Register relays (total 37)

An explanation of the functions of the various relays will be helpful in tracing the circuits of the register. The relays may be divided into the following four groups:

(a) Register proper (18 relays, Figs. 10, 10a):
DR—dialing relay. Follows dial impulses.
R1R—slow release relay. Does not fall off during pulsing.
R2R—slow releasing change-over relay. Does not fall off during pulses but only when the circuit is opened between the dialing of digits when DR comes to rest on its front contact.
RAR—operates when the register is picked up and adapts the register to select the first line finder and the calling line.
RBR—operates when the calling line is picked up by the first line finder and releases RAR.
RCR—multi-contact relay to provide ground holding contacts.
RDR—operates when the first pulse is received and transfers the grid of V1B from the calling line potential PC to the busy potential PB thus adapting the register to control the selectors.
RER—disconnects the identifying service class potential PS when dialing commences and in place thereof connects potential PJ to the grid of V1A.
RFR—low resistance relay in series with the $a$ wire. Operates when the selector is hunting.

(a) Register proper (18 relays, Figs. 10, 10a):—
Continued.
> RGR—a slightly slow releasing relay. Operated by RFR and when operated, connects the grid of VIA to the PN or PT potential and, when on its back contact, to potential PJ. This relay always makes its back contacts before relay GSR1 breaks its front contacts.
> RLR—operates when the "units" are being selected. Prepares register for release or change to in-dialing to P. B. X.
> RPR—operates when "tens" are being dialed to remove potential PB from the grid of VIB.
> XR—multi-contact relay. Restores digit switches to normal.
> GVR—high speed relays. Operated by gas valves. Speed in breaking relatively heavy current at back contact essential requirement.
> GSR—slow releasing relay. Operated by GVR. Used to establish condition necessary for change-over from one selection to the next or for release.
> HTBR—connects the high tension plate battery of 140 volts to one electrode of the gas valves GV1 and GV2 and to one side of the windings of relays GVR1 and GVR2.

(b) Translator unit (6 relays, Fig. 10b):
> RTR1—connects two-digit translator link to register when any first digit 2 to 7 is dialed.
> RTR2—connects three-digit translator link when two-digit translator link finds the first two digits dialed from part of a three-digit office prefix.
> RTR3—starts selection when the translation is complete.
> RTR4—reduces office prefix selection to three.
> RTR5—with RTR4 reduces translation to two selections.
> RTR6—arranges register for seven-digit dialing.

(c) Out-trunk unit (9 relays, Figs. 10 and 10a):
> RHR—operates RMR and momentarily applies battery to the a wire to prepare out-trunk circuit.
> RMR—converts register from local multi-potential selection to dial impulse out-trunk selection.
> RKR—starts out-trunk selection.
> RJR—stops out-trunk selection and restores PT marker switch to normal between digits.
> ROR—arranges register for release on calls to another Universal office.
> RNR—arranges register for in-dialing to P. B. X.
> RSR—slow release relay used in conjunction with PR(—) to release register on calls to another Universal office.
> PR(—)—polarized relay. Operates on calls to other Universal offices.
> PR(+)—polarized relay. Operates to start out-trunking to Universal or Strowger offices.

(d) Timed alarm relays (4 relays, Figs. 10 and 10a):
> TAR1—starts timed alarm No. 1.
> TAR2—sends calls to local trunk, potential PD.
> TAR3—starts timed alarm No. 2.
> TAR4—sends calls to local trunk, potential PE or to hold-over.

Multi-potential selection

Local switching is multi-potential controlled. The register is set for a given potential, for example, 6 volts, after which the selector or finder hunts until it finds a free trunk or line the $t$ wire of which has the same potential. Opening or grounding of the $t$ wire makes the trunk or line busy. The final selector bank may have as many as 23 different potentials on the various T terminals, yet a selector will pass over all potentials until it reaches the one for which it is searching. The normal storage cell potential of 1.7 to 2.7 volts offers adequate separation and the potentials of the various terminals may vary as potentials of the storage cells do. However, all like potentials must be connected to the same source. A mere change of the T potential changes the trunk or line assignment. A P. B. X. trunk group in the final banks is formed by connecting all trunks in the group to the same potential; they need not be consecutively numbered.

The selector hunts for one of two potentials and operates the register circuit when the first is reached. When the final tests a busy line and does not find the required potential (referred to as PN), it continues to the end of the "tens" group where it finds the busy potential (referred to as PB).

The calling subscriber is selected under the control of the A-register in the same manner as the called subscriber (see Fig. 1). This requires the use of high speed first and second line finders. Further to reduce the average selecting time, each group of one hundred subscribers' lines is divided into two groups of 50 each, referred to as an upper and lower group. The first line finder trunks are similarly divided into two groups in the banks of the second line finders. One-half of the first line finders in each group have their home position at one end of the terminal bank, and the other half have their home position at the other end of the terminal bank. The second line finders are similarly positioned, one-half at each end of the bank. The R-links are also split, one-half serving the upper B-links and the other half the lower B-links, to which the upper and lower groups of second line finders are connected. R-links adapted to connect a register with B-links, and starter and chooser circuits for R-links are similarly arranged in upper and lower groups.

When, for instance, a subscriber in the upper group calls, the associated starter and chooser circuit causes all idle upper R-links to hunt for an idle upper B-link and an idle register, and then chooses the first R-link. The chosen A-register causes the selected upper second line finder to choose an upper first line finder, and after this the first line finder to choose the calling line.

Under normal conditions all this takes place in less than one second. When all finders or links of the first choice are busy, second choice finders or links are picked up, extending the waiting time for the dialing tone from a minimum of about one second to a maximum of three seconds.

One group of second line finders may serve as many as ten groups of first line finders. The starter circuit gives to the register the distinguishing potential of the calling line group; thus the second line finder selects only a first line finder of that group.

Since the calling line is selected in the same manner as a called line, i. e. under the control of the register which stops the hunting motion of the switch when it reaches terminals to which a certain potential is applied, identical circuits may be used for the first and second line finders, for the group selectors and for the final selectors.

To prevent the origination of false calls by the called subscriber when the calling subscriber hangs up first, an F-link (Fig. 9) comprising one relay is connected between the penultimate and final selectors. This link keeps the final connected to the called party until the latter hangs up.

Out-trunking and tandem-trunking

The A-register, as just stated, completes calls within the office on a multi-potential basis. On out-trunked calls, however, the A-register transmits dial type impulses over the trunk to a T-register in the incoming office, and this T-register completes the call in the incoming office on a multi-potential basis or tandem-trunks it to a third office on a dial impulse basis. The third office may complete the call locally on a multi-potential basis or tandem-trunk it on a dial impulse basis to a fourth office. There is no limit to tandem-trunking so far as switching is concerned.

An important feature is that trunking or tandem-trunking is possible from any level of any selector. No special provision need be made in advance in either the A-register or the T-register as regards the level or selector from which trunking is to take place. The conversion of the A or T-register from local multi-potential selection to dial impulse out-trunking is made when the selector picks up the out-trunk. Trunking, therefore, may be done from a first group selector level, second group selector, third, fourth or penultimate selector, and even from the final selector which has access to an automatic P. B. X arranged for in-dialing.

In the A-register at the originating office one digit switch is provided for each digit of the called subscriber's number. In the T-register for trunks from an office like the one here disclosed (a so-called Universal office), two digit switches are provided and used alternately to receive and transmit impulses from the originating A-register. On a terminating or tandem call the T-register is held with the A-register until the selection is complete, after which all registers are released and the R or TR-links take over and are held until the called party answers or until the calling party hangs up as on a busy call. For calls from a Strowger type office the T-register has four or five digit switches because there are no means for storing calls in such office. When dialing into an automatic P. B. X from such T-register, the first one or two digit switches are used twice.

Tandem-trunking from a Strowger office through a Universal office is done in the same manner as though the originating office were Universal.

When used in systems having unsplit selector banks and translation, unrestricted tandem-trunking increases the flexibility, and often the efficiency of the network. Tandem-trunking may be employed to reduce annual costs, or as an economical way to take care of transient conditions when direct pairs are not available. The fact that tandem-trunking may be done from any selector level in the originating or tandem office or offices still further facilitates the initial or ultimate planning of the trunking system. Tandem-trunking from the fourth group or penultimate selectors often permits the economical installation of satellite exchanges. This would be difficult in a system having fixed numbering or in one in which special selectors and other equipment must be installed to permit tandem-trunking.

In-dialing to P. A. X's

A P. A. X may have the usual six-digit number assigned to it which when dialed calls in the P. A. X attendant. By listing a second number in the directory and dialing this number and the P. A. X station number, without waiting for a second dialing tone, a P. A. X station may be called direct. One and the same group of P. A. X trunks is used for both kinds of calls.

TRUNKING PLAN

The selector has an unsplit bank of 120 terminals. Translation and unrestricted tandem-trunking makes it possible to plan trunking within an office and between offices in a most economical manner and to handle efficiently transient conditions which may occur during the growth of a large telephone network.

In a bank divided into fixed levels, only the assigned levels may be used. For example, in a selector having ten fixed levels of which four are assigned for use, 60% of the total trunk terminals must remain idle. An unsplit bank of 120 terminals may be divided into four groups and all the terminals may be used. The bank may be divided into one group of sixty, three groups of twenty, or into four groups of thirty each, or in any other manner. It is well-known that the efficiency of a trunk group increases with its size. With banks having fixed divisions it is often necessary to kill a whole level for one or two trunks. In the Universal system a distinguishing potential would be assigned to these trunks. The potential may be applied to any terminal in the bank and, if required for local trunks, the number of switching or selecting operations would not have to be reduced. However, the normal ten numerical selections may still be made.

ESTABLISHMENT OF A LOCAL CONNECTION

R-link selected

When a subscriber starts a call the line relay LR (Fig. 4) operates and disconnects the numerical potential PN from the $t$ wire of the line, and replaces it with calling line potential PC. LR also grounds the common lead to the R-link starter and chooser circuit (Fig. 5).

Let us assume that the call is from a line in the upper group of fifty lines (Fig. 1). Relay USR (Fig. 5) operates when LR pulls up and grounds the common starting lead X to the associated group of R-links (Fig. 6). Should the call be from a line in the lower group of fifty lines, relay LSR (Fig. 5) would operate and energize the other group of R-links.

Relays LSR (Fig. 6) of all idle R-links associated with the R-link starter and chooser or selector circuit (Fig. 5) operate and energize their respective B-link finder power magnets PI, circuit from ground, front LSR, back TIR, winding power magnet PI to battery. When an idle B-link is found a circuit is established from ground, front LSR, high resistance winding of TIR, brush T of B-link finder, off-normal contact ONC4 (Fig. 7) of the second line finder, ONC4 of first group selector, winding relay BAR, back BER to battery. TIR (Fig. 6) operates, de-energizes power magnet PI and shunts its high resistance winding by its low resistance winding in series with low resistance relay T2R, thereby making the selected B-link busy to all other R-links.

BAR (Fig. 7) locks up to the T terminal over a front contact so that it will not release when off-normal contacts ONC4 open, as they do when the second line finder and first group selector move out of their home positions. Over another front contact, BAR energizes BBR and over still other front contacts BAR grounds wires c, c1 and t. The ground on c energizes relay BR of the second line finder and also relay BR of the first group selector. These two separate circuits are identical and hence are illustrated by the single Figure 2b. The second line finder (Fig. 2b) has its left-hand leads, a, b, c, c1, and t connected to the corresponding leads at the left side of the B link (Fig. 7). The first group selector (also illustrated by the circuit of Fig. 2b) has its leads a, b, c, c1 and t and e and f connected to the corresponding leads at the right side of the B link (Fig. 7). BBR (Fig. 7) disconnects the transmission bridge from the a and b wires and in place thereof connects these wires to the A and B brushes of the R-link.

T2R (Fig. 6) energizes register finder power magnet P2 over the back contact of T3R. When an idle register is found, a circuit is established from ground, front T2R, high resistance winding T3R, brush T of register finder, winding RAR (Fig. 10) of the register, back RBR to battery. T3R (Fig. 6) operates; de-energizes P2 and shunts its high resistance winding by its low resistance winding in series with T4R, thereby making the register busy to all other R-links. The R-link is now "available." RAR (Fig. 10) disconnects dialing relay DR from the a and b wires and in place thereof connects the b wire to the grids of three electrode vacuum tubes V2A and V2B. The a wire is grounded over a circuit to be described later. RAR energizes high tension battery relay HTBR, the circuit including back contacts and armatures of GSR1 and 2, which places high tension battery on the anodes of the triodes.

The chooser switch magnet PC1 (Fig. 5) is energized, circuit from ground, front T4R (Fig. 6), common lead y, back T1R (Fig. 5), interrupter x of PC1, winding PC1 to battery. The self-operated interrupter contact x causes this switch to hunt for an "available" R-link, of which there may be more than one. When the first idle "available" R-link is reached, T1R (Fig. 5) operates, circuit from ground, front USR, high resistance winding T1R, brush T, front T4R (Fig. 6), resistor R1 to battery. T1R (Fig. 5) de-energizes PC1 and closes the circuit of its low resistance winding in series with T2R, thereby making the R-link busy to all other chooser switches.

T2R (Fig. 5) energizes LAR (Fig. 6) over the A brush of the chooser switch. LAR operates and closes the register finder brush circuits A to G, inclusive. The PN potential which is characteristic of the first line finder group serving the calling line is placed on the D brush of the register finder (Fig. 6) by T2R (Fig. 5) over brush B of the chooser switch, front LAR (Fig. 6), brush D of register finder, back RER (Fig. 10), front RAR, back RPR, back RGR, back TAR2, back TAR4 to grid of V1A.

*Second line finder operates*

When LAR (Fig. 6) is energized, the circuit of relay AR (Fig. 2b) of the second line finder is closed; the circuit may be traced from ground (Fig. 10), back RBR, back GVR1, back GVR2, back GSR1, winding RFR, front RAR, brush A of register finder (Fig. 6), front LAR, back LCR, brush A of B-link finder, front BBR (Fig. 7) of B-link, off-normal contact ONC1 of the second line finder (Fig. 2b), winding AR to battery. AR locks up and connects the second line finder power magnet P over front BR also to the grounded a wire. The second line finder searches for an idle first line finder having the PN potential of the calling line group.

When an idle first line finder with the proper PN potential is found, this potential is placed on the grid of tubes V2A and V2B (Fig. 10) from PN potential at the first line finder (Fig. 2c), resistance rt, ONC4, back BR, back AR, T terminal of the second line finder (Fig. 2b), thence over front contact of BR of the second line finder, front AR, b wire, front BBR of B-link (Fig. 7), B brush of the B-link finder (Fig. 6), back LCR, front LAR, brush B of the register finder, front RAR of the register (Fig. 10) to grids of V2A and V2B.

With the grids V1A and V2A at the same potential, a gas tube GV1 fires and energizes GVR1. When GVR1 opens its back contact AR and P of the second line finder (Fig. 2b) are de-energized and the second line finder comes to rest on the terminals of the first line finder. When brush C makes contact, BR of the first line finder (Fig. 2c) is energized; circuit from ground, front BAR (Fig. 7), wire c1, brush C of second line finder (Fig. 2b), ONC2 of first line finder (Fig. 2c), winding BR to battery. Over its front contact GVR1 (Fig. 10) energizes GSR1, which releases HTBR, which in turn opens the high tension battery (HTB) circuit, thereby de-ionizing GV1 and releasing GVR1.

*First line finder operates*

Shortly after the release of GVR1, GSR1 releases and the a wire is again grounded. This time AR and P (Fig. 2c) of the first line finder operate over the same kind of circuit as traced for the second line finder.

The first line finder searches for the calling line, on the t wire of which LR has placed the calling line potential PC. When the calling line is reached, the PC potential is passed back to the register over the b wire circuit. The potential so placed on the grids of tubes V2A and V2B is the same as that normally on the grid of V1B over the back contact of RDR (Fig. 10). Therefore, GV2 fires and energizes GVR2. GVR2 opens the a wire circuit thereby releasing AR and P (Fig. 2c) of the first line finder which comes to rest on the terminals of the calling line. GVR2 (Fig. 10) operates GSR2, and GSR2 operates RBR and releases HTBR. The latter de-ionizes GV2 and de-energizes slow releasing GVR2.

*Subscriber receives dialing tone*

RBR (Fig. 10) energizes relay LBR (Fig. 6) of the R-link, circuit from ground, back RDR, front RBR, resistor R, brush C of register finder (Fig. 6), front LAR, windings LBR and LER in parallel, and to battery. The current through LER is not sufficient to operate it; LER operates only when resistor R is removed from the circuit. LBR opens the circuit of LSR. RBR (Fig. 10) opens the circuit of RAR which reconnects dialing relay DR through two windings of dial tone coil DTC to the *a* and *b* wires and, lastly, connects dialing tone interrupter DT1 through a third winding of DTC.

When the A and B brushes of the first line finder make contact with the terminals of the calling line, the line circuit is closed through the DR relay (Fig. 10) and the subscriber hears the dialing tone just before or at the same time as the cut-off relay COR (Fig. 4) operates and disconnects the line relay LR from the line. No loud click will be heard by the subscriber should he listen before the dialing tone is connected. The cut-off relay COR operates from the ground placed on the *c1* wire over the front contact of BAR (Fig. 7). DR (Fig. 10) energizes R1R which locks up RBR before GSR2 releases.

R-link starter and chooser circuit released

The R-link starter and chooser circuit is released when the calling line is found and seized by the first line finder and the line relay LR (Fig. 4) is released. The circuit of RAR (Fig. 10) of the register is opened and the circuit of LBR (Fig. 6) of the R-link closed, both by RBR (Fig. 10) when it was energized as above described by GSR2 upon the selection of the calling line by the first line finder. LR (Fig. 4) removes ground from the starting lead to the starter circuit (Fig. 5) deenergizing NSR. RBR (Fig. 10) opens also the holding circuit of T3R and T4R (Fig. 6) of the R-link. T4R, in turn, opens the holding circuit of T1R and T2R (Fig. 6) and removes ground from the starting lead *y* to the chooser switch circuit (Fig. 5) which is now normal and ready for the next call. Parallel with these operations, LBR (Fig. 6) which was energized by RBR (Fig. 10) upon the finding of the calling line, grounds the holding circuit of LAR (Fig. 6), opens the circuit of LSR, and operates BER (Fig. 7) of the B-link through resistor R and brush C. The current through R is not sufficient to energize BDR (Fig. 7) in multiple with BER. BER opens the B-link finder test circuit extending through ONC4 of the first group selector and the winding of BAR, and before the latter falls off, closes a multiple circuit through BBR and energizes BRR which grounds wires *c* and *c1* of the B-link, the latter through resistor R2.

Premature release

The connection is under the control of the line relay LR (Fig. 4) until the dialing relay DR (Fig. 10) takes over. Should the subscriber hang up before this happens, LR falls away and releases the starting circuit which, in turn, releases the partially completed connection. Should the subscriber hang up after DR takes control and before dialing, DR falls away and momentarily closes the circuit of R2R over a front contact of R1R. R2R operates RDR which opens the *c* wire, thereby releasing LBR of the R-link (Fig. 6) which, in turn, releases BER and BRR of the B-link, (Fig. 7). Removal of ground from the *c* and *c1* wires in the B-link returns the first and second line finders to normal.

First choice B or R-links all busy

It was assumed that the calling line was in the first sub-group of fifty, that is, in the upper group. The first line finders and second line finders (B-links) are each divided into two equal groups (Fig. 1); one group serving the lines in the upper half of the bank and the other the lines in the lower half of the bank. The group of B-links and associated second line finders serving the upper half are connected to the odd terminals and the group of B-links serving the lower half to the even terminals in the banks of the B-link finders of the R-links. The R-links are similarly divided into two groups, one serving the upper group of subscribers' lines and picking up as a first choice the upper group of B-links, and the other serving the lower group of lines and picking up as a first choice the lower group of B-links. During normal traffic the upper and lower groups operate more or less independently and thereby halving the maximum normal hunt, reducing it from, say 120 terminals to 60 terminals.

During periods of heavy traffic loads, all B or R-links of the first choice may become busy. When all B-links of a first choice are busy, a series circuit is closed through contacts on the BRR relays of the various B-links (Fig. 7) to ground. This circuit energizes the busy relays UBR or LBR, as the case may be. A sufficient number of these relays is provided to connect each T terminal to the second choice bank. In the case of a full bank of sixty terminals, of two groups of 30 each, there would be four UBR relays and four LBR relays, each with eight contacts. When these relays are energized, the B-links of one group are made accessible as second choice to the R-links of the other group.

Similarly, when all R-links of a first choice are busy, a series circuit is closed through contacts on the LBR (Fig. 6) or LCR relays of the busy R-links. If, for instance, all R-links of the upper group be busy when a call is started, then USR (Fig. 5) will operate as usual but in this case relay LSR will also operate, circuit through right-hand winding, lead *z*, series contacts of LBR or LCR (Fig. 6) of the upper group to ground. LSR (Fig. 5) causes the second group of R-links to hunt for what in this case are second choice B-links.

Register checks service class of calling line

When COR (Fig. 4) operates, it places the service class potential PS (in this case automatic coin service) on the *t* wire through a small radio type resistor *rt2* of about 2,000 ohms. When RAR (Fig. 10) releases, the same PS potential is placed on the grid of V1A via back contacts of TAR4, TAR2, RGR, RPR, RAR and RER. The grid circuits of V2A and V2B may be traced from PS, front COR (Fig. 4), *t* wire through first and second line finders, back BAR (Fig. 7), back MR (PS is always negative and therefore current does not pass rectifier S(+)), brush D of the B-link finder of the R-link (Fig. 6), front LAR, brush D, back RER (Fig. 10), back RAR to grids of V2A and V2B.

The register and the R-link are, in the present case, arranged to note only one special service, namely automatic coin box. Thus, when potential PS is found on the *t* wire, GV1 fires for the second time and operates GVR1, which in turn operates GSR1, which in addition to de-ionizing GV1 and releasing GVR1 by releasing HTBR, closes a circuit from + metering battery, high resistance resistor R, back RDR (Fig. 10), front RBR, front GSR1, brush E, front LAR (Fig. 6), rectifier S(+), winding LJR to ground. LJR operates and locks up to negative battery over a front contact of LBR. LGR (Fig. 6) and hold-over relay HOR (Fig. 7) of the B-link do not operate because of the low resistance shunt over R2 (Fig. 6) to negative battery. LJR prepares for the automatic collection or release of coins GSR1 (Fig. 10) operates RER which locks up and removes potential PS from the grid of V1A and in place thereof connects potential PJ.

Register and translator

The register circuit is for a six or seven-digit network. It is designed to meet changing traffic conditions as the area grows and as offices and new or special services are added. It is also arranged for "in" dialing into automatic P. B. X's.

In the particular trunking plan here exemplified the first, second and third digits are assigned as follows:

| | |
|---|---|
| 0 | Toll and assistance |
| 1 | Spare |
| 8 | Spare |
| 90 | Ten two-digit special service trunks |
| 20, 30, 40, 50, 60, and 70 | Fifty-five two-digit prefix offices with full translation including two additional selections if required. Excluded are office prefixes 20, 24, 65, 74, and 75. |
| 200, 240, 650, 740 and 750 | Fifty three-digit prefix offices with full translation including one additional selection. |

By translation is meant the switching of a call over a route numerically independent of but determined by the number dialed. A two-digit office prefix such as 34 may, for example, be translated for switching purposes into any predetermined two, three or four-digit number such as 29, 293, 2972, etc. When a three-digit office prefix is dialed it may also be similarly translated into any predetermined combination of two to four digits, and thus a selection may be added or dropped or the same number of selections—but of different values—performed. Translation frees trunking from the number dialed and permits the trunk plant to be arranged and used in the most economical manner. Each translator link has capacity for sixty offices so that one group of two-digit and one group of three-digit translator links will take care of the above-described number assignment.

Subscriber dials first digit of typical two-digit Office prefix—34

DR (Fig. 10) follows the dial pulses and each time it makes and breaks its back contact it advances the first digit switch DI (Fig. 10b) one step, circuit from ground, back DR, front R1R, winding R2R, brush A of the "in control" switch PI, terminal 1, winding of magnet D1 to battery. R1R does not fall off during pulsing. R2R operates on the first pulse and remains energized until the end of pulsing when DR remains on its front contact long enough to allow it (R2R) to fall off. When R2R makes its front contact, it energizes PI, circuit from ground, front RCR, front R2R, winding PI to battery. D1 and PI are small step-by-step switches of the type in which the brushes are advanced on the release and not on the attraction of the armature and pawl; their energization alone does not advance the brushes. Since we are dialing the prefix "34," digit switch D1 goes to position 3 when digit 3 is dialed.

RDR operates in multiple with PI; circuit from ground, front RCR, front R2R, back RDR, winding, RDR to battery. RDR disconnects its winding from R2R and locks up over a front contact of RCR, and does the following: (a) it opens the dialing tone interrupter circuit and thus cuts the tone from the calling line, (b) it disconnects positive battery from the armature of GSR1, (c) it disconnects potential PC from the grid of V1B and in place thereof connects the grid to potential PB via a back contact of RPR, and finally (d) energizes RER, if not already energized on a call from a coin box station. RER disconnects grid of V1A from potential PS and in place thereof connects it to potential PJ, and it grounds the circuit of the D brush over back contacts of RLR and RPR.

When DR comes to rest on its front contact after the dial pulses cease, R2R releases and PI goes to position 2.

Two-digit translator link picks up register

A circuit is established from ground, brush C of PI (Fig. 10a), brush A, terminal 1 of "out control" switch PO, brush A of D1, terminal 3, brush D of PI, winding RTR1, to battery. RTR1 operates common two-digit translator link starting relay CSR1 and at the same time places a test potential on the T terminals of the two-digit translator link register finder banks. CSR1 grounds the common starting lead x.

Relays TSR (Fig. 11) of all idle two-digit translator links (ONC1 closed) operate and energize their associated register finder power magnets P1 and relays TNR. All idle register finders (Fig. 11) will hunt for the register and the first to reach it closes a test circuit from battery, back RTR2 (Fig. 10b), front RTR1, resistor R10, terminal T, brush T (Fig. 11), high resistance winding of T1R, front TSR to ground. T1R opens the circuit of PI and shunts its high resistance winding with its low resistance winding in series with a low resistance holding winding on TSR and thus makes the register busy to all other links. This low resistance shunt causes CSR1 (Fig. 10b) to fall off and release the other hunting translator links.

Subscriber dials second digit of office prefix—34

DR (Fig. 10) advances D2 to position 4 in the second position of PI. When R2R falls away for the second time, it advances PI to position "3." When D2 (Fig. 10b) reaches position "1," a circuit is established from ground, terminal segment 1/11, brush A of D2, front RTR1, winding RTR3, brush G (Fig. 11), back TDR, high and low resistance windings of TAR to battery. RTR3 (Fig. 10b) does not operate but TAR (Fig. 11) does and releases the somewhat slow releasing TNR; the purpose of which is to prevent the translator finder out running the dial.

Translator set for a four selection translation

The translator finder magnet P2 is energized, circuit from ground, back TNR, front TAR, back TCR, back GVR, back GSR, winding P2 to battery. The finder searches for the set of terminals cross-connected for office prefix "34," which, in this case, occupies position "14" (bank chart, Fig. 12).

In explanation of the wiring of the T terminals (see Figs. 11 and 12), it should be said that the first digits 2 to 7, inclusive, occupy the 1st, 11th, 21st, 31st, 41st and 51st positions respectively; in row T1, being connected to PN potentials 2, 3, 4, 5, 6 and 7. The groups of nine T1 terminals between these six first digit positions are normally not connected to any PN potential (see Fig. 11). When, therefore, brush T1 (Fig. 11) hunts for the first digit of the office prefix it is not disturbed by the potentials ultimately used in selecting the second digit. It will be noted from Fig. 12 that the first digit potential, for example PN2, is not repeated in the following nine positions, and similarly PN3 is not repeated in the nine positions that follow; neither are PN4, PN5, etc. By using the first digit terminals also as a second digit terminal, a position is saved and it is only necessary to set aside ten positions for each of the ten office prefixes in the 20, 30, etc. groups instead of eleven positions.

Actually, position "1" on the the chart is for office prefix "22," position "11" for office prefix "33," and so on. The assignment of potentials to the T1 terminals is permanent and is not affected by changes in the translation potentials in rows A, B, C and D.

With D1 (Fig. 10b) in position 3, potential PN3 is placed on the grid of V1 (Fig. 11), circuit from PN3 (Fig. 10b), terminal 3, brush B of D1, back RTR3, brush A of register finder (Fig. 11), back TBR, back TER to grid V1. When the test brush T1 of the translator finder reaches the terminal connected to potential PN3 (position 11, Figs 11 and 12), GV fires and energizes GVR. GVR opens the circuit of P2 and the translator finder makes a momentary stop in this position. GVR energizes GSR, which in turn energizes TER over a back contact of TFR. TER locks up over a back contact of TCR. GSR opens high tension battery circuit which de-ionizes GV and releases GVR. GVR releases GSR, which is slightly slow releasing, so as to assure de-ionization of GV and the energization of TER. When GVR makes its back contact, TFR operates and locks up over the back contact of TCR. The adjustment of armature springs a1 and a are such that a1 replaces high tension battery on the tube circuit at the same time as or before the circuit of P2 is again closed but after contact X makes. Thus, should the second digit potential be the same as the first digit potential, GV would fire and operate GVR before the finder could move out of the position it reached under the control of the first prefix digit dialed by the calling party.

Except when the second digit potential is the same as the first, as above explained, P2 hunts the second time immediately upon release of GSR. With D2 (Fig. 10b) in position 4, potential PN4 is placed on the grid of V1 (Fig. 11) via brush B of the register finder, and when brush T1 of the translator finder reaches the first terminal after the eleventh to which potential PN4 is applied (position 14, Fig. 12), GV fires the second time and operates GVR. GVR stops the transaltor finder and energizes GSR. GSR energizes TCR over a front contact of TFR. TCR locks up over a front contact of TAR. GSR opens the high tension battery circuit, de-ionizes GV and releases GVR. The circuit of P2 is not closed again because it is now opened at a back contact of TCR.

TCR energizes TBR which disconnects brushes A and B of the register finder from the tube circuit and connects them to the corresponding brushes of the translator finder. TCR releases TFR and TER, and short circuits the high resistance winding of TAR, thereby operating RTR3 (Fig. 10b) which releases RTR1. RTR3 locks up over brush A of D2. RTR1 removes test potential from the T terminal of the register finder and in so doing releases the common starting relay CSR1 and the test relay T1R (Fig. 11).

Office prefix "34" is now translated into the arbitrary prefix "6289." This translation is shown on translator bank chart (Fig. 12). In position "14," in which the translator finder is now stopped, potential PN6 is multipled to the A terminals of the translator finder banks, PN2 to the B terminals, PN8 to the C terminals and PN9 to the D terminals. A ground is placed on the E terminals which operates RTR4 and RTR5 (Fig. 10b) over the E brushes of the two finders (Fig. 11). One cross-connection per office prefix suffices for all translator links.

*First group selector operates under translator control*

RTR3 (Fig. 10b) disconnects brush B of D1, D2 and D3 from positions 1, 2 and 3 of bank C of the "out control" switch PO but leaves these positions of PO connected to brushes A, B and C, respectively, of the register finder (Fig. 11) in the translator link. RTR3 returns D1 to its home position, over off-normal contact x, and will then be in position to take P. B. X digits.

RTR3 grounds terminal 1, brush B of PO, and thus the a wire circuit which causes the first group selector to start hunting, circuit from ground, front RTR3, terminal 1, brush B of PO, back GVR1, back GVR2, back GSR1, low resistance winding RFR, back RAR, back RMR, back RHR, brush F of register finder of R-link (Fig. 6), front LAR, back LFR, brush F of B-link finder, wire a (Fig. 7), ONC1 of first group selector (Fig. 2b), winding AR to battery. AR operates and locks itself and the power magnet P to the grounded a wire. RFR (Fig. 10a) energizes RGR.

Brush A of translator finder (Fig. 11) places potential PN6 (Fig. 12) on the grid of V1A, circuit from PN6, brush A of translator finder, front TBR, brush A of register finder, terminal 1, bank C of PO (Fig. 10a), front RGR, back TAR2, back TAR4 (Fig. 10) to grid of V1A. When the first group selector finds a free second selector with potential PN6, a circuit is established from PN6 of the second selector (Fig. 2a), ONC4, back BR, back AR, t wire, T brush of first selector (Fig. 2b), front BR, front AR, b wire (Fig. 7), brush G of B-link finder (Fig. 6), back LFR, front LAR, brush G of register finder, back RMR (Fig. 10) to grids of V2A and V2B. GV1 fires and operates GVR1. GVR1 opens the circuit of the a wire, RFR (Fig. 10a), and, in the selector (Fig. 2b), of AR and P. The first group selector comes to rest on the terminals of the wanted trunk.

When GV1 (Fig. 10) fires, the potential on the T brush of the selector (Fig. 2b) is increased and the selected trunk is thus made instantly busy. RGR (Fig. 10a) is released by RFR but, being slightly slow releasing, will not make its back contacts until GVR1 has broken its front contact. GVR1 energizes slow releasing relay GSR1. GSR1 energizes PO (Fig. 10a), releases HTBR (Fig. 10), and opens the a wire circuit. The release of HTBR de-ionizes GV1 and de-energizes GVR1. When GVR1 breaks its front contact, GSR1 is de-energized and shortly thereafter breaks its front contact, whereupon PO goes to position "2." When GSR1 makes its back contact, the a wire circuit, which has now been held open long enough to allow RGR (Fig. 10a) to make its back contacts, is again closed.

*Second group selector operates under translator control*

With PO in position 2, the a wire is again grounded and the second selector hunts, circuit from ground, brush A of D2 (Fig. 10b), terminal 2, brush B of PO, thence over a wire circuit to the second selector (Fig. 2a), AR and P of which lock up to the a wire. RFR and RGR operate.

Potential PN2 (Fig. 12) is placed on the grid of V1A (Fig. 10) over brushes B of the translator link (Fig. 11) and terminal 2, brush C of PO (Fig. 10a).

When the second selector reaches a free trunk with potential PN2, the potential is placed on the grids of V2A and V2B (Fig. 10) over the *b* wire and GVI fires a second time making the selecter trunk instantly busy. GVRI operates and releases AR and P of the second selector, and RFR (Fig. 10a) releases RGR. GVRI again operates GSRI and PO goes to position 3.

*Third group selector operates under translator control*

The *a* wire is grounded for a third time and starts the third group selector hunting, circuit from ground, brush C of PI (Fig. 10a), brush A, terminal 3 of PO, front RTR5 (Fig. 10b), terminal 3, brush B of PO to the *a* wire circuit. AR and P of the third selector (Fig. 2a) operate and lock to the *a* wire. RFR and RGR operate for the third time.

Potential PN8 (Fig. 12) is placed on the grid VIA over brushes C of the translator link and terminal 3, brush C of PO.

When the third group selector finds a free trunk with potental PN8, the potential is placed on the grids of V2A and V2B over the *b* wire circuit and GVI fires for a third time. GVRI opens the *a* wire circuit, releasing AR and P of the third selector and RFR (Fig. 10a). GSRI sends PO to position "4" and the operations previously described are repeated.

*Tandem selector operates under translator control*

With PO in position "4" the *a* wire is grounded for the fourth time, this time over the front contact of RTR4 (Fig. 10b). Potential PN9 (Fig. 12) is placed by brushes D of the translator link on the grid of VIA. When the tandem selector (see Fig. 1) finds a trunk with potential PN9, GVI fires for a fourth time, the selector comes to rest and PO goes to position "5."

*Translator link released*

When brush A of PO (Fig. 10a) reaches position "5," D2 is returned home and RTR3 (Fig. 10b) and TAR (Fig. 11) are released. TAR releases TCR, and over back contacts and over off-normal contacts ONC3, sends PI and P2 to their home positions. TCR releases TBR and when the off-normal contacts ONCI close in their home positions, the translator link is ready for the next call.

*Two and three selection translations*

RTR4 (Fig. 10b) and RTR5 are both energized by a direct ground on brush E of the translation link for a four selection translation as just described. When a ground through a suitable resistance is placed on the E brush (position 16, Fig. 12) relay RTR4 does not operate and after the third selection PO by-passes position "4," the position for the fourth selection, circuit from ground, brush A, terminal 4 of PO, back RTR4, interrupter *x* of PO, winding PO to battery, PO goes to position "5." When no ground is placed on brush E (position 18, Fig. 12), neither RTR3 nor RTR4 operate and PO by-passes positions "3" and "4" and the translation is made in two selections.

*Subscriber dials typical three-digit office prefix 245*

When the first two digits are dialed, the two-digit translator finder (Fig. 11) goes to position "4" (Fig. 12). This position is cross-connected for the two digits "2" and "4." These two digits are always the first two of a three-digit office prefix, and this is indicated by a ground placed on terminal T2 of the translator finder bank. When TCR (Fig. 11) operates, as it does when the translator finder comes to rest, a circuit is closed from ground, brush T2, front TCR, winding TDR, brush F, winding RTR2 (Fig. 10b) to battery. TDR operates and opens the circuits of TAR (Fig. 11) and RTR3 (Fig. 10b). RTR3 is not operated at the time but TAR is and the latter now releases and in so doing restores the two-digit translator link to normal. RTR2 locks up over brush D of PO. RTR2 releases RTRI which opens the two-digit starting and test circuit and releases CSRI. RTR2 closes the three-digit starting and test circuit and operates CSR2. A three-digit translator link register finder (Fig. 13) now picks up the register in the same way as the two-digit translator, i. e. by grounding the starter wire *x* and energizing TSR and PI (Fig. 13).

The three-digit translator link is connected to the register after the second digit is dialed, but before the third digit is dialed and at the same time the two-digit translator is dropped. There is no unnecessary holding of a translator link.

When the subscriber has dialed the third office prefix digit, in this case "5," D3 (Fig. 10b) goes to position "5" and PI to position "4." A circuit is established from ground, segment 1/11, brush A of D3, front RTR2, winding RTR3, brush G of register finder (Fig. 13), high and low resistance windings of TAR to battery. TAR operates and closes the circuit of the translator finder magnet P2 and the finder searches for the first digit (position 1, Fig. 14) of the office prefix 245.

DI, D2 and D3 (Fig. 10b) place, respectively, potentials PN2, PN4 and PN5 on brushes A, B, and C of the register finder (Fig. 13). When the translator finder brush TI reaches the terminal connected to potential PN2, GV (Fig. 13) fires, energizing GVR which opens the circuit of P2 and energizes GSR. GSR operates TER over back contacts of THR and TFR. TER locks up over a back contact of TCR. GSR de-ionzes GV and releases GVR and when the latter makes its back contact again, it energizes TFR which locks up. GVR releases GSR which again places high tension battery on the tube circuit and closes circuit of P2.

TER connects the second digit potential PN4 from brush B of register finder to the grid of VI (Fig. 13) over the back contact of TGR. TER also transfers the grid of V2 from test brush TI to test brush T2. The finder is now ready to hunt over the row of T2 terminals (Fig. 14) but as PN4 appears in the same column as PN2, GV fires instantly and GVR operates a second time before power magnet P2 has had time to energize the clutch.

GVR operates GSR. GSR energizes TGR over a back contact of THR and a front contact of TFR. TGR locks up over a back contact of TCR. GSR de-ionizes GV and releases GVR for the third time. TGR transfers the grid of VI from brush B to brush C of the register finder and energizes relays PNRI and PNR2, which place potentials on the nine terminals following each of the five second digit terminals. When GSR makes its back contacts after being released by GVR, THR is energized and P2 attempts to hunt for the third time. It is successful this time and hunts for potential PN5 of the third digit. When it reaches the wanted terminal (positions 5, Figs. 13 and 14) GV fires and GVR operates for the third time, releasing P2 and energizing GSR.

GSR energizes TCR which locks up over a front contact of TAR. TCR releases TER, TFR, TGR and THR, energizes TBR, and short-circuits the high resistance winding of TAR, thereby energizing RTR3 (Fig. 10b).

From now on the register and the translator link operate in the same manner as in the case of a two-digit prefix with the exception that PO by-passes position "5" instead of remaining in that position. It is driven to position "6" by a circuit from ground, brush A, terminal 5 of PO front, RTR2, contact x of PO, winding PO to battery.

Subscriber dials typical six-digit office number 34-6345

The register is arranged for mixed six and seven-digit dialing, which is often necessary in large cities that have no office prefix translation. When six digits are dialed, digit switches D1 to D6 are used. When seven digits are dialed, digit switches D1 to D7 are used. In the first case digit switches D1 and D2 are used for office prefix translation and D3 for straight numerical selection, whereas in the latter case all of these first three digit switches are used for office prefix translation. In the first case position "5" of PO is used and in the second case it is by-passed. The following tables give the functions performed in the various positions of the "in control" (PI) and the "out control" (PO) switches:

TABLE I
*In-control switch PI*

| Position | Six-Digit Dialing | Seven-Digit Dialing |
| --- | --- | --- |
| 1 | Home—dialing first digit | Same. |
| 2 | Dialing second digit—two-digit translator connected. | Do. |
| 3 | Dialing third digit-translator selection. | Dialing third digit—two-digit translator released, three-digit translator connected. |
| 4 | Dialing fourth digit, selecting fourth digit. | Dialing fourth digit, translator selection starts, followed by fourth digit selection. |
| 5 | Dialing fifth digit, selecting fifth digit. | Same. |
| 6 | Dialing sixth digit, selection waiting. | Dialing sixth digit, selecting sixth digit. |
| 7 | Waiting completion of selection or dialing first P. B. X digit. | Dialing seventh digit, selection waiting. |
| 8 | Dialing second P. B. X digit. | Waiting completion of selection or dialing first P. B. X digit. |
| 9 | Waiting completion of selection on P. B. X "in" dialing. | Dialing second P. B. X digit. |
| 10 | | Waiting completion of selection on P. B. X "in" dialing. |

TABLE II
*Out-control switch PO*

| Position | Six-Digit Numbers | Seven-Digit Numbers |
| --- | --- | --- |
| 1 | Home—first selection, translator. | Same. |
| 2 | Second selection, translator | Do. |
| 3 | Third selection, translator | Do. |
| 4 | Fourth selection, translator | Do. |
| 5 | Selecting third dialed digit | (By-passed). |
| 6 | Selecting fourth dialed digit | Selecting fourth dialed digit. |
| 7 | Selecting fifth dialed digit | Selecting fifth dialed digit. |
| 8 | Selecting sixth dialed digit | Selecting sixth dialed digit. |
| 9 | Release or selecting first P. B. X digit. | Selecting seventh dialed digit. |
| 10 | Selecting second P. B. X digit. | Release or selecting first P. B. X digit. |
| 11 | Release on P. B. X dialing | Selecting second P. B. X digit. |
| 12 | | Release on P. B. X dialing. |

D5 and D6 are shown connected for use in a six-digit office. The "tens" potentials PT, which are positive and thus differ from the normal negative numerical PN potentials, are in this case connected to bank B of D5. Bank A of D6 is connected to terminal 7, bank B of PI and, as described later, the selection terminates with PI in position "7". No change is necessary when another six-digit number is called but when a seven-digit number is dialed, bank A of D6 is grounded over a front contact of RTR6. Bank A of D7 is connected to terminal 8, bank B of PI and selection terminates with PI in position "8" (see Table I).

Relay RTR2 operates only when a three-digit office translator is attached. When the register is used on a seven-digit number, bank B of D6 is connected to potentials PT and bank B of D5 to potentials PN. Bank C of D5 is connected, B of D5 is suppressed and one just like it added to D6 under the control of relays RMR (Fig. 10) and RTR (Fig. 10b). Otherwise there is no change.

Let us assume that the six-digit number 34-6345 is dialed and that the office prefix "34" is translated into three selections (position 16, Fig. 12). When PO goes to position "5" after completing the office prefix selection, the *a* wire is grounded for the fourth time, circuit from ground, segment 1/11, brush A of D3 (Fig. 10b), back RTR2, back RTR3, terminal 5, brush B of PO, thence to the *a* wire. The fourth selector (Figs. 1 and 2a) hunts for a trunk with the potential PN6, the potential to which the third digit switch D3 was advanced when the subscriber dialed the digit "6." When a free trunk of the proper potential is found, GV1 (Fig. 10) operates and PO goes from position "5" to position "6."

When the subscriber dials the fourth digit, in this case "3," D4 goes to position "3." When the *a* wire is grounded from segment 1/11, brush A of D4, terminal 6, brush B of PO, the penultimate selector (Fig. 2a) searches for and selects a final selector (Fig. 2d) identified by the potential PN3 and PO goes to position "7." RPR (Fig. 10a) operates, circuit from ground, brush C of PI, brush A of PO, terminal 7, winding RPR to battery. RPR locks up over a back contact of RLR and removes potential PB from grid of V1B (Fig. 10) and potential PJ from grid of V1A. For reasons to be more fully explained below, potential PB is removed to prevent premature operation when the final hunts for the "tens" terminal.

When the subscriber dials the "tens" digit, in this case "4," D5 goes to position "4" and places positive potential PT4 on the grid of V1A (Fig. 10), via back contact of RMR (Fig. 10) and terminal 7, brush C of PO. The final searches for the "tens" terminal of the same potential and when it finds that terminal, GV1 (Fig. 10) operates in the usual way, the final comes to rest on the selected "tens" terminal (Figs. 2d and 18) and PO goes to position "8."

When the subscriber dials the last or "units" digit, in this case "5," D6 goes to position "5." Ground is placed on the *a* wire to start the hunting only when the dialing is complete, whereupon PI goes to position "7."

The A terminal of the "tens" position in each final bank are connected together and wired to the winding of the final selector relay AR as shown in Fig. 18 and in dotted line in Fig. 2d (see also Fig. 8). These terminals are not multiplied from bank to bank. When ground is placed on the *a* wire for the last time, a circuit is closed from ground, brush B of PI, terminal 7, segment 1/11, brush A of D6 to terminal 8, brush B of PO, AR and P (Fig. 2d) are energized and the final hunts for the called line. When RGR (Fig. 10a) operates, RLR is energized over circuit from ground, brush C of PI, brush A of PO, terminal 8, front RGR, winding RLR to battery. RLR locks up over front contact of RCR. RLR releases RPR. When the final reaches the wanted subscriber's line the terminal T of which carries a potential PN5, GVI operates and the final comes to rest. PO goes to position "9."

*Subscriber dials seven-digit office number 245-6345*

When PO goes to position "6" after completing the office prefix selection, the next four office digits are selected as above described. However, in this case digit switches D4 to D7 are used in place of digit switches D3 to D6.

*Out-trunking*

The register proper and the translator operate on interoffice out-trunk calls in the same manner as on intra-office calls, but the operating potentials normally received from the selectors over the *b* wire are received from a small switch PT (Fig. 10a) in the out-trunk part of the register. Every trunk selected is tested by the register for out-trunk possibilities. This test is made between the time when RGR (Fig. 10a) makes its back contacts and before GSRI (Fig. 10) breaks its front contacts and sends PO into the next position. This permits out-trunking from any level of any group selector, and even from a final selector when in-dialing to P. A. X.

When RGR (Fig. 10a) makes its back contacts after a selector has picked up an out-trunk (Fig. 17), which it does in the usual way, the out-trunk identification potential PJ is placed on the *b* wire over the back contact of AR of the out-trunk and, consequently, on the grids of V2A and V2B (Fig. 10). With RGR on its back contacts (and HTBR re-energized over a back contact of RGR), this identifying potential is always placed on the grid of VIA, circuit from PJ, front RER (Fig. 10), back RAR, back RPR, back RGR, back TAR2, back TAR4 to grid of VIA. GVI fires and operates GVRI and a circuit is established from ground which is on brush B of PO, front GVRI, back RGR, back RLR, front RER, back RMR, winding RHR to battery. RHR, which is slightly slow releasing, energizes RMR which locks up over a front contact of RCR and in so doing disconnects RHR. RMR connects the *a* and *b* wires to the out-trunk impulsing circuit including contacts of RJR and RKR (Fig. 10a). RHR releases, but before doing so, momentarily places battery on the *a* wire of the trunk, thus energizing AR (Fig. 17) of the out-trunk circuit which locks up over a front contact of CR, disconnecting the second winding of CR from the out-trunk and, in place thereof, connecting the A and B brushes of the selector to the *a* and *b* wires of the out-trunk.

With RMR (Fig. 10) energized, the out-trunk circuit is closed through a loop in the register including either PR(+) or PR(-) (Fig. 10a), depending upon the direction of flow of current in the out-trunk line.

If the out-trunk leads to a distant Universal office, the direction of current flow at the moment of selection is such as to operate relay PR(-) (Fig. 10a) which, in turn, operates ROR over a back contact of RLR. ROR locks up over a front contact of RCR (Fig. 10). When the out-trunk is subsequently connected to a T-register in the distant Universal office, the current is reversed, PR(-) (Fig. 10a) releases and PR(+) operates. The relay ROR is operated to place the release of the A-register (Fig. 10) under the control of the distant T-register, thus permitting unrestricted tandem trunking. The release of the A-register takes place when current in the out-trunk is again reversed.

When the out-trunk is to a Strowger type office, the direction of current flow upon selection is such as to operate relay PR(+) (Fig. 10a) and not relay PR(-). Relay is released after the proper number of digits have been dialed.

When the *a* wire circuit is grounded at the B brush of PO (Fig. 10a) for the first selection following the seizure of the out-trunk, a circuit is established from ground at the B brush of PO, back GVRI, back GVR2, back GSRI, winding RFR, back RAR, front PR(+), winding RKR, ten-cycle interrupter to battery. RKR operates, energizes PT and RJR. RKR opens in its back contact the out-trunk loop, but this has no effect at this stage because the contact is shunted by brush B of PT. RJR disconnects itself from RKR and locks up over a back contact of GSRI.

When the ten-cycle interrupter opens after having fully energized RKR, the latter breaks its front contact and PT goes to position 2, in which it removes the short-circuit from the contact of RKR. The initial short-circuiting of the contacts of RKR assures that all impulses actually sent out over the trunk are of the same and proper duration. RJR short-circuits the relays and rectifiers normally in the trunk loop and keeps the *a* wire circuit to the register closed when PR(+) falls away.

When RKR is energized a second time, the trunk loop is opened and PT is again energized. After a certain lapse of time, RKR again closes the trunk loop and PT advances from the second to the third position. Assuming that the translator or register is set for potential PN3, brush A of PT will find this potential in position "5" after RKR has sent out three impulses over the trunk loop. With potential PN3 connected to grids of V2A and V2B over brush A of PT, GVI fires and opens the *a* wire circuit in the usual manner, thereby preventing the re-energization of RKR. GVR₁ operates GSR₁ and GSR₁ remains on its front contact long enough to allow RJR to send PT to its home position over interrupter *x* of PT, whereupon *x* opens.

PO goes to the next position when GSR₁ breaks its front contact. This longer closure of the trunk loop by an inactive RKR allows the T-register, or the Strowger selector, as the case may be, to change over for the next selection.

When the "tens" digit is sent in an out-trunk selection, RMR switches terminal 7, brush C of PO from connection with PT potentials, over brush B of D5, to PN potentials, over brush C of D5. Thus PN potentials are used for all out-trunk selections including the "tens."

*Called line free*

When the called line is in the originating office and is free, PO (Fig. 10a) goes to position "9" or "10," depending upon whether the called number has six or seven digits. As previously explained, relay RTR₂ (Fig. 10b) is energized when a seven-digit number is called and energizes RTR6. When PO goes to position "9" on a six-digit call, the c wire to the R-link is grounded, circuit from ground, back ROR (Fig. 10a), back RNR, back RTR6 (Fig. 10b), terminal 9, brush D of PO, front RLR to the c wire. When RTR6 is energized, terminal 10 instead of terminal 9 is grounded. The grounding of the c wire sends the R-link into the "ringing" position, after which the R-link opens the a and b wires, releasing DR (Fig. 10). DR releases the slow releasing relay R4R. When R4R breaks its front contacts all energized relays and off-normal digit switches are returned to normal, either directly or indirectly.

When the line called is in a distant Universal office and is free, the distant T-register momentarily reverses the current in the trunk line. Relay PR(—) (Fig. 10a) operates and energizes slow release relay RSR, circuit from ground, front PR(—), front RLR, front ROR, winding RSR to battery. When the reversal ceases, PR(—) makes its back contact and grounds the c wire over front contact of RSR. As the e wire of the R-link is already grounded by RMR (Fig. 10) through resistor R, the R-link goes to the "ringing and busy" position, after which it releases the A-register as on a local call.

When the called line is in a distant Strowger office and is free, the A-register functions at this stage as on a local call and grounds the c wire. However, since the e wire to the R-link is already grounded by RMR through resistor R, the R-link goes to the ringing and busy position, whereupon the register is released as on a local call.

Called line busy

When the called line is in the originating exchange and is busy, the final selector does not find the required PN potential on the T terminal of the called line and continues to hunt until it reaches the busy position terminal (Fig. 20), of which there is one following each group of ten lines (Fig. 8). All busy position T terminals are connected to potential PB. The grid of V1B (Fig. 10) is connected to potential PB over back RPR (Fig. 10a) and front RDR. GV2 (Fig. 10) fires and operates GVR2 which opens the a wire and causes the final to come to rest on the busy position terminal. GVR2 operates RSR2 which opens the c wire to the R-link (Fig. 6). This causes the R-link to release and to release, in turn, the register. The busy tone is supplied by the busy position terminal circuit (Fig. 20). Neither the R-link nor the register is held on a local busy connection. The R-link, however, is held on a busy connection to a distant office as explained below.

When the called line is in a distant Universal office and is busy, the distant T-register signals the A-register and the A-register the R-link as on a free call. The busy tone is supplied from the busy position circuit in the distant exchange.

When the called line is in a distant Strowger office and is busy, the A-register and R-link function as on a free call to a Strowger office. The busy tone is supplied from the distant Strowger connector.

P. B. X trunk groups (selecting P. B. X attendant)

Main lines and P. B. X lines have identical central exchange equipment (Fig. 4). Any group of lines between adjacent busy position terminals of a final selector (Fig. 20) may be connected to the same PN potential and thus made into one group of P. B. X lines (positions 2 to 6 and 8, Fig. 6). No other change is necessary. The lines need not be adjacent to each other, but they must be between the same two busy terminals. If a group larger than ten is required, one or more busy position terminals may be suppressed. At the P. B. X the lines terminate in ring-down trunks and metering does not take place until the P. B. X attendant answers. If the P. B. X is arranged for automatic local switching, the trunk lines to the central office may be used for out-dialing from the P. B. X when this is desirable. It is common practice to assign one level in the P. B. X, say level "9," for out-dialing. When this digit is dialed the P. B. X subscriber picks up a trunk to the central office and when the A-register is connected, the city dialing tone is received, after which the wanted number may be dialed.

Since all P. B. X trunks when operating as a common group are connected to the same potential, the trunks cannot be plugged through for night service and listed in the directory by their normal bank position number without some means to restore the position potentials when the P. B. X attendant's switchboard is shut down for night or holidays. One way to accomplish this is to connect the T terminals of all but the first one or two P. B. X trunks to a change-over relay as shown at the bottom of the line circuit Fig. 4. Assume the case of a group of six P. B. X trunks, four of which are to be used for directory night service listing. The T terminals of the first two trunks would be permanently connected to the P. B. X potential which we will assume is PN1. The T terminals of the last four trunks would be connected respectively over back contacts of relay XCR to their normal potentials PN3 to PN6. The trunks used for night service listing would be these last four. In a pinch the second trunk could also be used but, as will be seen from the following description of the operation, it is here used as a cushion against intermittent false operation. This potential shift circuit provides automatically for day and night service.

During normal day operation when the second P. B. X trunk is picked up, COR (Fig. 4) of that trunk energizes XCR and disconnects the normal position potentials from the last four trunks and in place thereof connects the common P. B. X potential, thus forming all trunks into one group.

The telephone directory carries the alternate night or holiday numbers and when one of these numbers instead of the normal P. B. X number is dialed, the first two P. B. X trunks will not be picked up and relay XCR will not be operated. When XCR is not energized, the characteristic PN potentials remain connected to the last four trunks and they may be called by their position numbers.

An alternative to automatic operation is to energize XCR by throwing a key on the P. B. X attendant's switchboard. This, however, would require an additional wire. In heavy cable networks where P. B. X's are most common, this would not be an important point.

False calls, slow or incomplete dialing

Should the calling subscriber fail to dial within 20-40 seconds, or should he take more than 20-40 seconds between the dialing of digits, or fail to complete dialing, the timed alarm circuit No. 1 (Fig. 10a) will operate and transfer the call to a false call trunk (Fig. 15) or to a local trunk (Fig. 16).

The alarm circuit is closed from ground, front RCR (Fig. 10), back R2R, winding TAR1 (Fig. 10a), back TAR1, interrupter to battery. TAR1 may operate instantly or during any period up to 20 seconds, depending upon the position of the live contact of the interrupter. When it does operate, it locks up and connects TAR2 to the circuit. If dialing is not started within 20 seconds after the energization of TAR1 so as to energize R2R (Fig. 10) and thus release TAR1, the interrupter will close the circuit of TAR2 which connects the grid of V1B (Fig. 10) to potential PD and at the same time grounds the *a* wire.

The selector under control will now hunt for a false call or for a local trunk having potential PD. When such a trunk is found GV1 (Fig. 10) fires, GVR1 and GSR1 operate, and the selector comes to rest on the terminals of the local trunk.

Potential PB is normally on the grid of V1B over back RPR and front RDR. This potential is placed on the grids of V2B and V2A over the *b* wire via back contact of relay AR (Fig. 15 or 16). GV2 fires, energizing GVR2 which, in turn, energizes GSR2. GSR2 removes ground from the *c* wire, thus releasing the R-link. The R-link releases the register and frees itself from the B-link. The calling line is connected to the local trunk through the B-link (Fig. 7). The call is not metered.

Continuous hunting and hold-over

When the *a* wire circuit is grounded, the selector hunts for an idle trunk. It will continue to do so until one is found or until it is released by the register. To limit hunting to 5–10 seconds, time alarm circuit No. 2 (Fig. 10) is closed from ground on the B brush of PO (Fig. 10a) through the winding of TAR3 (Fig. 10). Should this ground remain unbroken for more than 5–10 seconds, TAR3 will operate TAR4. TAR4 places potential PE on the grid of V1A and, as there is a "continuous hunting" local trunk (Fig. 16) with potential PE connected to some spare terminal in each selector bank, this trunk is picked up and the call transferred to an intercepting operator.

The routing of "continuous hunting" calls to an attendant has the advantage of enabling an attendant to spot overloaded parts of the exchange since the repetition of "continuous hunting" calls when a given number or group of numbers are dialed will be an indication that the route to that number or group is congested. Since separate trunks may be run from the different bays of group selectors, the identity of the trunk picked up indicates the approximate point of congestion.

Should the *a* wire circuit be open when the B brush of PO grounds it, or should it be grounded outside, the timed alarm circuit No. 2 will operate in 5–10 seconds and, since RFR (Fig. 10a) and RGR do not operate under these conditions, the hold-over circuit will be closed over the *e* wire through the low resistance winding of TAR4 (Fig. 10), to ground at the back of RGR. This releases the calling subscriber but otherwise retains the connection, including the register, in its advanced position. In explanation it should be said that resistor R connecting the *e* wire to battery over the front contact of RMR on a trunk connection is high in value and for this reason does not send the B-link (Fig. 7) into the hold-over position. It merely places the R-link (Fig. 6) into the "ringing and busy" position as previously explained. The hold-over lamps HOL (Fig. 10) is lighted and the attention of the exchange attendant is called to the fault, which may be traced down by him while the partial connection is still established. During moments when the exchange is not attended, the hold-over key HOK is thrown and the hold-over feature of timed alarm No. 2 is disabled.

Timed alarm No. 2 being placed in operation when timed alarm No. 1 operates, should the selector fail to pick up a false call or other local trunk within 5–10 seconds, the incomplete connection would be sent into the hold-over position and the calling subscriber would be released.

Subscriber dials special services

The special service numbers are 0, a single digit number, and 90, 91 to 99, ten two-digit numbers. The digit 0 is reserved for assistance calls and when it is dialed, the first digit switch D1 (Fig. 10b) goes to position 10, in which potential PN10 is placed on the grid of V1A (Fig. 10). The *a* wire circuit is immediately grounded and the first group selector hunts for a local trunk (Fig. 16) having this potential. The trunk terminates at an operator's position. A translator link is not picked up. Potential PB is placed on the *b* wire and the register and R-link are released.

When the subscriber dials a two-digit number beginning with the digit "9," digit switch D1 goes to position "9" and places potential PN9 on the grid V1A. The first selector hunts for and selects a trunk connected to the same potential, in this case to a group of special service second selectors (Fig. 2c). When the subscriber dials the second digit, the second digit switch D2 goes to the corresponding position and a local trunk (Fig. 16) to an operator is picked up by the second selector, whereupon potential PB is again placed on the *b* wire, which results in the release of the register and R-link.

Extension of subscribers' numbers

In assigning numbers, the first digits "1" and "8" are left as spares for calling certain special services or for the extension of the subscribers' numbers. The additional subscribers' numbers could be used without translation, though this would appear undesirable. Preferably, the additional numbers are used with translation and all subscribers' numbers have three-digit office prefixes; translation insures economical trunking and elimination of unnecessary selecting operations. To make use of digits "1" and "8," terminals 1 and 8 of the A bank of digit switch D1 are disconnected from terminals 9 and 10 and in place thereof connected to the winding of an additional RTR1 relay. When either of these digits is dialed, the additional RTR1 relay brings in one of the additional three-digit translator links, in this case, without first bringing in a two-digit link.

In-dialing into automatic P. B. X—General

When a calling main exchange subscriber dials a two-digit P. B. X station number, after having dialed a six-digit P. B. X number, digit switches D7 and D1 (Fig. 10b) go to corresponding positions in the usual way.

When a seven-digit conversion number is dialed, digit switches D1 and D2 are advanced. The two P. B. X station digits may be dialed immediately after the P. B. X conversion number without waiting for a second dialing tone and the local or distant register sends out the corresponding dial type impulses to the P. B. X. This in-dialing facility is in addition to the usual facility of calling in a P. B. X attendant by dialing a six or seven-digit P. B. X number. The same group of P. B. X trunks (Fig. 4) is used for both purposes.

When an automatic B. B. X is not equipped for in-dialing, the P. B. X trunks in the finder and final banks at the central office are arranged as indicated in bank chart Fig. 8, positions "2" to "6," inclusive, and "8." However, when provision is made for in-dialing to an automatic P. B. X, then the "tens" terminal immediately preceding the P. B. X trunk group is wired as a conversion circuit (Fig. 18, position 25, Fig. 8). Such circuit is individual to a final bank but may be applied to three or four "tens" positions in the bank. A group of finals equipped with one conversion circuit for in-dialing may, therefore, serve three or four P. B. X's equipped for in-dialing, one being placed in each group of ten lines following the particular "tens" terminal wired over back contacts of relay CR (Fig. 18).

A typical in-dialing arrangement of the final bank is shown in Fig. 8, starting with the third "tens" terminal, position "25." The P. B. X trunk group occupies the next six terminals 26 to 31, inclusive, leaving terminals 32 to 35, inclusive, for use as main lines or other P. B. X trunks without in-dialing. Any six of the ten terminals may be used in place of the first six, provided they are given the same PN number. Not more than one P. B. X having in-dialing may be placed between the same "tens," but no terminal is disabled and the full group of ten remains available for trunks or lines.

A P. B. X having in-dialing would be listed under two numbers in the directory: the P. B. X number which when dialed would call in the P. B. X attendant, the P. B. X conversion number which when dialed would convert the A-register or the T-register for in-dialing to the P. B. X. The last digit of the P. B. X number must always be higher by one than the last digit of the conversion number. If, for instance, the PN potential of the B. B. X number is one, then the PN potential of the conversion number must be 0 (PNX, Fig. 18). This is necessary so that after conversion the register "units" digit switch (D7 or D1) may be used again, by being advanced one step, and cause the final to hunt for a free trunk in the P. B. X trunk group just as though the P. B. X number had been dialed in the first place. The listing in the directory of the P. B. X number (a) and the P. B. X conversion number (b) might be as follows:

(a) 34-6331     ABC Company
(b) 34-6330-10   Order Department
      34-6330-11   Purchasing Department
      34-6330-22   Receiving Department
      34-6330-35   Superintendent of Manufacture
      34-6330-58   Night Watchman As many of the one-hundred two-digit numbers as desirable may be listed in the directory. The remainder, may, of course, be called even though not listed. In practice only a few of the important and night service numbers would be listed. The P. B. X station numbers used for in-dialing may or may not be the same as those used for calling locally within the P. B. X.

Provision may be made for the dialing of one, two or three-digit P. B. X numbers by adding one or two relays to the register circuit, but one-hundred two-digit numbers will be sufficient for all practical purposes.

If the P. B. X is arranged for in-dialing, the P. B. X trunk to the central office (Fig. 4) is modified as shown in Fig. 19. At the P. B. X the trunk terminates in an "in" selector or its equivalent, of which DR is the dialing or stepping relay, in a ring-up line relay LR1, and in the banks of the "out" selectors. The trunks may be used for in and out automatic service as well as for in and out manually attended service.

When a trunk is picked up by a final on a call to the attendant, ringing current is applied in the usual way and LR1 operates, locks up, lights line lamp LL and busy lamp BL and operates cut-off relay COR1, thus removing the in-dialing bridge and making the trunk busy to the P. B. X "out" selectors. In case of an in-dialing call, ringing current is not applied to the trunk, but the closed loop of the trunk impulsing circuit of the register is placed across the a and b wires, energizing DR. DR operates R1R which operates COR2 and makes the trunk busy to the attendant and "out" selector.

The P. B. X may be of any well-known type in which the switch is advanced by the usual dial pulsing of the DR relay. Ringing current or busy tone, as the case may be, is supplied by the P. B. X selector. When the P. B. X station answers, current in the P. B. X trunk is reversed and the call is metered.

On out-going calls from the P. B. X, either manual or automatic, the direction of current flow is reversed, battery being placed on the a wire, thus energizing LR at the central office and DR (Fig. 10) of the A-register circuit.

*P. B. X conversion number 34—6330—28 dialed (P. B. X at originating office)*

When the "tens" digit of a six-digit number is dialed, PO (Fig. 10a) is in position "7" (see Table II) and RPR is operated and locked up over a back contact of RLR. RPR removes potentials PJ and PB, respectively, from grids V1A and V1B. When the final comes to rest in the "tens" position, CR (Fig. 18) operates and disconnects the "tens" potential PT3 from the T terminal and in place thereof connects the "units" potential of the conversion number PNX, in the case PNO. Potential PJ is placed on the b wire but since RPR (Fig. 10a) has removed this potential at the register, nothing happens at this stage.

When the register commences the selection of the "units" digit of the P. B. X conversion number, PO (Fig. 10a) is in position "8" and ground is placed on the a wire in the usual way. RFR and RGR operate, also AR (Fig. 2d) of the final circuit over brush A and terminal A of the "tens" position (Fig. 18). The potential PNO on the T terminal being the same as that on the grid of V1A, GV1 (Fig. 10) fires the moment AR of the final (Fig. 2d) connects the T brush to the b wire. GV1 operates GVR1 (Fig. 10) and opens the a wire circuit before the final clutch magnet P (Fig. 2d) has had time to move the final out of the "tens" position. When RGR (Fig. 10a) closes its front contact at the start of the selection, RLR is operated by brush A of PO. RLR releases RPR.

GVR1 (Fig. 10) energies slow release GSR1 which energizes PO and releases HTBR which, in turn, de-ionizes GV1 and releases GVR1. RFR releases RGR. When RGR makes its back contacts, it re-energizes HTBR over back RNR. RGR also places potential PJ on the grid of V1A. Since the potential PJ exists also on the b wire (Fig. 18), and the a wire circuit is still open at back GSR1 (Fig. 10), GV1 fires for the third time with the final on the "tens" terminal, this time energizing RNR (Fig. 10a), over back RGR, front RLR and back RNR. RNR locks up.

Digit switch D6 is energized when RNR makes its front contact, via back contact of RTR6 (Fig. 10b). RNR opens the circuit of HTBR (Fig. 10) which releases and de-ionizes GVI and releases GVRI. When GVRI opens its front contact, D6 goes from position PO10 to position "11" and thus places potential PN1 on terminal 8, brush C of PO, instead of the original "units" potential PN0. PN1 is the "units" digit potential of the P. B. X number.

When GSRI finally breaks its front contact, PO does not go to position "9" but remains in position "8" since its circuit is closed to ground via front RNR and back RMR. When GSRI makes its back contacts and again closes the a wire circuit, the final hunts for an idle trunk in the P. B. X group having potential PN1 (position 26 to 31, Fig. 8). When one is found GVI fires, GVRI operates, stops the final, and energizes RMR via front RGR and RNR. RMR locks up and cuts in the trunk impulse circuit as on an out-trunk connection. PO goes to position "9" but the c wire is not grounded since RNR has removed ground from one armature of RTR6.

With PO in position "9" and with the trunk impulse circuit closed through to the P. B. X relay DR (Fig. 19), PR(+) (Fig. 10a) operates and two impulses are sent to the P. B. X. When GVI (Fig. 10) fires PO goes to position "10" in which eight impulses are sent to the P. B. X and P. B. X station "28" is called. GVI fires for the last time and PO goes to position "11" in which the c wire is grounded via back ROR, terminal 11, brush D of PO. The R-link goes to the ringing and busy position since RMR has grounded the e wire through R, and releases the register.

*P. B. X conversion number 68–330–28 dialed (P. B. X at another Universal office)*

On in-dialing calls to a P. B. X of a distant Universal office, the T-register at the distant office handles the call. Relays ROR (Fig. 10a) and RMR (Fig. 10) are energized. ROR removes ground from RTR6 (Fig. 10b) so that the register is not released until PR(−) (Fig. 10a) receives the releasing impulse as on an ordinary out-trunk call. Strowger connectors are not arranged to permit in-dialing to a P. B. X station, but this may be done if a special repeating connector or selector switch is installed. This special switch will momentarily reverse the current in the trunk line when the "tens" level, over which trunking to the P. B. X is to take place, is tested. This will energize PR(−) which, in turn, will energize RNR over the front of RLR and back of ROR. It should be remembered that ROR is not energized on an out-trunk call to a Strowger exchange as it is on an out-trunk call to another Universal exchange. This is so because PR(−) is energized on a trunk call to a Universal exchange when the out trunk is picked up and, therefore, before RLR is energized. The energization of RNR removes ground from positions "9" and "10" of bank D of PO before brush D of PO reaches these positions. Thus the R-link is not released until after the P. B. X station digits have been sent out by the T-register. The R-link is released when brush D of PO reaches positions "11" or "12," as the case may be.

*Release of register*

It will be found helpful to keep in mind the manner in which the R-link and A-register are released.

(a) After a successful call to a subscriber at the originating office, brush D of PO grounds the c wire to the R-link. The R-link goes to the "ringing" position and releases the A-register by opening the a and b wires. The R-link releases when the calling subscriber answers.

(b) Following a call to a busy subscriber at the originating office, relay GSR2 operates and removes ground from the c wire. The R-link releases itself and the A-register.

(c) Following a call, successful or unsuccessful, to a sub-station in a P. B. X connected to the originating office, brush D grounds the c wire and sends the R-link to the "ringing and busy" position. The R-link releases the A-register. The R-link is released when the called party answers or when the calling subscriber hangs up.

(d) Following a call, successful or unsuccessful, out-trunked to another Universal office to a called subscriber at that office or to a P. B. X station or to a called subscriber reached by tandem trunking at a third office, the current in the trunk loop is momentarily reversed when the called line is picked up, thereby operating relays PR(−) and RSR, which grounds the c wire when the reversal ceases and sends the R-link into the "ringing and busy" position. The R-link releases the A-register.

(e) Following a call, successful or unsuccessful, out-trunked to a called subscriber at a Strowger exchange, the D brush of PO grounds the c wire and sends the A-register to the "ringing and busy" position. The R-link releases the register.

(f) When dialing from a Universal office into a P. B. X connected to a distant Strowger office, the special connector located in the Strowger office momentarily reverses the direction of current in the out-trunk loop when the P. B. X trunk group is tested and operates PR(−) which transfers the c wire grounding connections to brush D of PO from positions "9" or "10" to positions "11" or "12," depending upon whether an eight or nine-digit number is dialed. When the D brush reaches the new positions, the c wire is grounded and the R-link goes to the "ringing and busy" positions. The R-link releases the register.

(g) Following the dialing of a special number or a timed alarm call to a local trunk, GSR2 removes ground from the c wire and as the e wire is not grounded through resistor R, the R-link releases the register as well as itself and the local trunk is connected to the B-link.

(h) When the calling subscriber hangs up while the register is still connected, the register is released when DR falls away and releases RLR, thus removing ground from the c wire. This also releases the R-link and the R-link releases the B-link.

R-LINK (FIG. 6) AND B-LINK (FIG. 7)

In the foregoing description emphasis was placed on the register. Some of the operations will now be reviewed with particular reference to the R and B-links.

While the register remains connected over an R-link to a B-link, LAR and LBR (Fig. 6) of the R-link and BER, BBR and BRR (Fig. 7) of the B-link are energized. BDR (Fig. 7) and LER (Fig. 6) are not energized because of insufficient current. Should the call be from a coin box station, LJR (Fig. 6) would also be energized. In the description, unless otherwise specified, the originating call will be assumed to come from a non-coin box line.

Called line in originating office free

When the called subscriber answers, the register, as in the previous case, places a full ground on the c wire. This energizes LER (Fig. 6). LER energizes LFR and LCR. LCR disconnects the a and b wires of the calling line from the dialing relay DR (Fig. 10) of the register circuit and in place thereof connects them to LDR (Fig. 6). LDR is connected before DR is disconnected so that the subscriber does not notice the change-over. LDR energizes LHR. LHR locks up LFR and LCR over its front contact, a back contact of LRR and a front contact of LFR before slow releasing LER breaks its front contact which it starts to do on certain connections when ground is removed from the c wire by the register. LHR closes the holding circuit of BER (Fig. 7) before LBR releases, circuit from ground, front LHR, back LRR, front LCR, resistor R to brush C. The A-register releases when slow release relay RIR (Fig. 10) breaks its front contact. When ground is removed from wire c, LBR (Fig. 6) releases. LBR releases LAR which opens the circuit of brushes A to G, inclusive, of the register finder.

When LFR operates, it connects ringing current to the a wire of the called line over brush F, one winding of LRR, back LGR, front LER to A. C. current source. LFR connects the b wire to battery over another front contact, another winding of LRR, back LGR to battery. Ringing current is thus immediately applied to the called line. LRR is the usual marginal relay and does not operate on ringing current in series with the called line ringer and condenser C1. The primary of the transformer is closed from the ringing tone interrupter RT1, back contacts of LKR and the front contact of LFR to ground. Shortly after the ground is removed from the c wire, LER releases and connects the a wire to the ringing current source through the usual ringing interrupter RI.

The bell of the called subscriber rings until the subscriber answers or until the calling subscriber hangs up. When the called subscriber answers, LRR operates and opens the holding circuit of LFR and LCR (Fig. 6) and BER (Fig. 7), all of which release promptly, the former disconnecting ringing current from the called line. LCR disconnects LDR from the a and b wires but by the time LCR breaks its front contacts BER (Fig. 7) and BBR of the B-link will have made their back contacts, thus connecting supervisory relay SIR to the calling line before or at the same time as relay LDR (Fig. 6) is disconnected. The change-over is substantially clickless.

LHR (Fig. 6) is slow releasing and, when LCR makes its back contact, a circuit is established from positive metering battery, resistance R4, front LHR, back LJR, back LCR, brush D (Fig. 7), rectifier S(+), winding MR, resistance R6 to ground. The metering relay MR operates and remains on its front contact until LHR breaks its front contact. During this time ground is removed from wire c1 which is connected over the T brushes of the first and second line finders to the windings of the line and cut-off relays and service meter of the calling line, and replaced by metering battery of +70 volts. This boosted potential of approximately 120 volts causes the calling line service meter (Fig. 4) to operate. When MR releases and again makes its back contact, the service meter armature resumes its normal position. When LHR (Fig. 6) makes its back contact, battery is again connected to the winding of the starting relay LSR and the R-link is ready for the next call.

Called line in originating office busy

When the called line in the originating office is found busy, the register circuit opens the c wire to the R-link, thereby releasing LBR (Fig. 6). LBR releases LAR of the R-link and BER (Fig. 6) of the B-link. Since LHR (Fig. 6) is not energized, MR (Fig. 7) is not energized and the call is not metered. BER releases BBR and the calling line is extended through to the talking bridge including supervisory relay SIR which operates and closes the circuit of BRR before it has had time to break its front contact. The busy tone is transmitted to the calling subscriber over the normal talking circuit of the B-link from the busy tone circuit (Fig. 20).

The B-link is released when the calling subscriber hangs up and opens the circuit of SIR. SIR falls off and releases slow release relay BRR. When BRR breaks its front contacts, it removes ground from the c wire and from the c1 wire, thereby releasing the cut-off relay of the line circuit (Fig. 4), the BR relay of the first line finder (Fig. 2c), and the two BR relays of the second line finder and first group selector (Fig. 2b). The selectors return to their home positions.

Called line in distant office free or busy

In both cases the A-register, when converted for out-trunking, places ground on the e wire over the front contact of RMR (Fig. 10) through resistor R. This energizes relay LGR (Fig. 6) of the R-link but not hold-over relay HOR (Fig. 7) of the B-link.

LGR (Fig. 6) operates LKR which disconnects the primary winding of transformer TT from the ringing tone interrupter and in place thereof bridges it across the out-trunk in series with condenser C2. The ringing or busy tone, as the case may be, is applied from the distant exchange and is heard by the calling subscriber through transformer TT.

LKR places a dead ground on wire c of the B-link, thereby energizing relay BDR (Fig. 7) which locks up over a front contact of BRR. BDR disconnects ground and battery from the normal called line transmission bridge and in place thereof connects the retardation coil for bridging across the out-trunk to hold it when the R-link releases and de-energizes BER and BBR.

When the register finds the called line free or busy, it places a full ground on the c wire the same as on a free call to a local subscriber. This energizes LER, as previously explained. LER operates LFR and LCR, after which LDR and LHR operate and lock up LFR and LCR, but as LGR is already energized, ringing current is not applied to the a and b wires. Instead, LRR is bridged across the trunk in series with rectifier S(−) and retardation coil in series with S(+). On a busy call, or until a free line call is answered, the direction of current flow in the trunk loop is such that current flows through the retardation coil but not through LRR. This bridge holds the trunk busy at the distant end. When the called party answers, the direction of current flow is reversed, LRR operates and the calling line meter is operated as on a local call.

Coin box operation

The A-register energizes LJR (Fig. 6) if the call is from a line equipped with an automatic coin box. LJR locks up over a front contact of LBR. The shunting effect of the comparatively low resistance of LJR and S(+) prevents the positive 70 volt battery, applied to the e wire through a resistor (Fig. 6), from operating LGR or HOR (Fig. 7).

On a successful call, LHR operates and holds LJR energized when LBR releases long enough to apply for the purpose of coin collecting positive 110 volts to the b wire of the calling line; circuit, 110 v.+ (Fig. 6), front LHR, front LJR, back LAR, back LCR to the b wire. LJR keeps the circuit of BER (Fig. 7) closed, whereby the circuit of the a wire is opened when LCR releases. When LHR (Fig. 6) breaks its front contact, LJR is de-energized and, in turn, releases BER (Fig. 7) which releases BBR, thereby establishing the talking connection.

On an unsuccessful call, the calling subscriber hangs up and DR of the register (Fig. 10) falls away and releases the register. The c wire is opened and LBR (Fig. 6) releases. LBR releases LAR. LJR is slow releasing and a momentary current of —110 volt battery is applied to the b wire over a back contact of LHR, front LJR, back LAR, back LCR to the b wire.

Hold-over

On a hold-over connection, the register applies ground over a low resistance winding of relay TAR4 (Fig. 10) and energizes HOR (Fig. 7) of the B-link and, incidentally, LGR (Fig. 6) of the R-link. This relay plays no part in a hold-over. When HOR (Fig. 7) operates, it opens wire c1, thereby releasing the calling subscriber and first line finder, but holding the remainder of the connection. Lamp HOL (Fig. 7) burns. HOR places a shunt across the a and b wires and prevents the register from releasing. A second guard lamp HOL (Fig. 10) burns indicating the hold-over at the register. The hold-over connection is released by depressing the hold-over key HOK in the register circuit.

Operation of BCR

The purpose of BCR (Fig. 7) is to remove the transmission bridge from the B-link when desirable on through connections to the wire chief or toll operator or to other special services. The normal resistance of the BR relay in the all-purpose selector circuit (Fig. 3) is too high to operate BCR in series when, for example, the first group selector picks up a normal second group selector (Fig. 2a). The same is also true when the first group selector picks up a special service group selector (Fig. 2c) but as the c wire is carried through to the C brush, BR may be shunted by a resistor or relay to battery and in this manner BCR may be operated.

F-link (Fig. 9)

An F-link is inserted in the trunk between the banks of the penultimate selector (Fig. 2a) and the final selector (Fig. 2d). When the penultimate selector seizes the F-link, relay CR (Fig. 9) is energized over the C brush. CR disconnects the A brush of the final (Fig. 2d) from the common timed alarm circuit (Fig. 9) and connects the A and B terminals of the penultimate to the a and b wires of the final. CR disconnects the final BR relay from the b wire and the final C brush from resistance R1 (Fig. 2d) and grounds in multiple through R2 (Fig. 9) wires c and c1. BR of the final operates.

The final is now connected to the penultimate as though the F-link were not there. The F-link serves no further purpose until the end of a connection when it comes into play should the calling subscriber hang up before the called subscriber, as is usually the case. The purpose of the F-link is to prevent the called subscriber from originating false calls in such cases.

When the penultimate is released, relay CR (Fig. 9) falls away and a circuit is established from ground, back TAR3, winding TAR1, back CR, brush A of final (Fig. 2d), closed loop of called line, brush B of final, back CR (Fig. 9), front BR of final, winding BR to battery. BR is thus retained energized in series with the closed called line loop. BR retains the cut-off relay (Fig. 4) energized, circuit from ground, front BR, resistor R1, back CR (Fig. 9), brush C of final, cut-off relay and service meter (Fig. 4) in multiple to battery.

The final circuit is thus held until the called subscriber hangs up and releases BR (Fig. 2d) which, in turn, returns the final selector to its home position and releases the called line.

Should the called subscriber fail to hang up within 10-20 seconds, TAR2 (Fig. 9) will energize TAR3. TAR3 removes ground from the line loop including brushes A and B, the final (Fig. 2d), thereby releasing BR (Fig. 2d) which held up over wire c, CR back contact (Fig. 9), wire b, whereupon the final selector releases, its magnet being energized over BR back and ONC3. The closed loop of the called line now picks up an A-register and if the loop circuit is not opened within another 20-40 seconds, the call comes in as a false call on the wire chief's desk, and it will not be necessary to trace the call from the final.

One timed alarm circuit serves a group of finals and when the circuit operates, it releases all finals in the group, reducing somewhat the holding time for some calls.

False call trunk (Fig. 15)

The operating winding of relay CR (Fig. 15) is of high enough resistance to prevent the operation of BCR (Fig. 7) of the B-link. The calling line receives current from SIR and controls the release of the connection. CR (Fig. 15) lights calling lamp CL over back contact of AR. The wire chief answers with a cord circuit and when plug AP is inserted into the answering jack AJ, BR operates when its winding is placed in multiple with that of BCR (Fig. 7). BR (Fig. 15) is a sensitive relay which energizes AR. AR locks up over a front contact of CR, removes the potential PB from the b wire and completes the talking circuit through to the answering jack AJ. AR extinguishes CL.

Should the wire chief wish to test the faulty line, he may do so by throwing the test key of the cord, thus replacing ground on the sleeve of the jack by battery through resistance R5. The second winding of CR and that of BR are of fairly low resistance, as is that of R5. The current in the c wire increases to operate BCR (Fig. 7) of the B-link. BCR removes the transmission bridge from the line and connects the a and b wires straight through to the answering jack. The release of the connection is now under the control of the wire chief who may make all required tests. Should he decide to maintain the connection, he will remove the plug from the answering jack, whereupon BR (Fig. 15) and BCR (Fig. 7) release. The control of the connection is returned to the supervisory relay SIR. When BR (Fig. 15) makes its back contact, it lights waiting lamp WL over a front contact of AR. This informs the wire chief that the call has been answered.

Should the faulty line not clear itself within due time, the wire chief depresses the identification key IK associated with the false call trunk, and automatically obtains the number of the calling line, after which he may order the line plugged out at the main distributing frame.

*Class-of-service indication (Fig. 16)*

The manner in which a local trunk to an operator is picked up has already been described and is briefly indicated on Fig. 16. When the group selector picks up a local trunk leading to an operator's position, CR (Fig. 16) operates and lights a line lamp CL over back contact of AR. The operator answers by plugging into jack AJ, thus energizing AR which locks up as long as the plug remains in the jack and extends the *b* wire of the connection to the calling line through to the answering jack. The release of the connection remains under the control of the calling subscriber through the supervisory relay SIR (Fig. 7).

When desirable, the local operators' trunks are equipped with class-of-service identification keys SIK (Fig. 16) associated with a common service class identification circuit. When SIK is depressed, the *t* wire of the connection to the calling line is connected to the grid of triode V1 associated with a multi-position switch. Relay DR is energized and closes the power magnet P circuit of the switch. The switch has two brushes: brush A which wipes over a row of terminals to which the various service class potentials PS1, etc. are connected, and brush B which wipes over a row of terminals connected to a set of identification lamps LI, etc. As explained in connection with the operation of the register, the calling line cut-off relay COR places a negative class-of-service potential PS on the *t* wire extending over the first and second line finders and the first and second group selectors to the operator's position. Should there be a service potential on the *t* wire when SIK is depressed, the identification switch will rotate until brush B picks up the corresponding potential on its bank and applies it to the grid of triode V2, whereupon GV fires, energizing GVR which causes the multi-position switch to come to rest in the selected position. GVR energizes ER which disconnects DR and locks up to ground at SIK. ER lights the identification lamp corresponding to the position in which the switch came to rest, indicating to the operator the class-of-service to which the calling line is entitled.

The following table illustrates the *t* wire potentials that may be assigned to the register for performing the various controlling operations which have been described:

| Negative | Volts | Positive |
|---|---|---|
| PN1 potential—digit 1 | 2 | PT1 potential—"tens" 1. |
| PN2 potential—digit 2 | 4 | PT1 potential—"tens" 2. |
| PN3 potential—digit 3 | 6 | PT3 potential—"tens" 3. |
| PN4 potential—digit 4 | 8 | PT4 potential—"tens" 4. |
| PN5 potential—digit 5 | 10 | PT5 potential—"tens" 5. |
| PN6 potential—digit 6 | 12 | PT6 potential—"tens" 6. |
| PN7 potential—digit 7 | 14 | PT7 potential—"tens" 7. |
| PN8 potential—digit 8 | 16 | PT8 potential—"tens" 8. |
| PN9 potential—digit 9 | 18 | PT9 potential—"tens" 9. |
| PN10 potential—digit 0 | 20 | PT10 potential—"tens" 0. |
| Pc potential—line calling | 22 | PJ potential, conversion to out-trunking. |
| PB potential—line busy | 24 | PE potential continuous hunting tone. |
| PS potential—service classification. | 26 | PD potential false call and slow dialing. |
| Do | 28 | PX potential routing test. |
| Do | 30 | PI potential identification. |
| Do | 32 | Potential identification. |
| Do | 34 | Do. |
| Do | 36 | Do. |
| Not used | 38 | Do. |
| Do | 40 | Do. |
| Do | 42 | Do. |
| Do | 44 | Do. |
| Do | 46 | Do. |
| Do | 48 | Do. |
| Main exchange battery | 70 | Booster metering potential (approx.). |
| | 150 | Plate potential (approx.). |

The above table illustrates the wide switching range of the system and the fact that the same potential may be used for many purposes, provided that it is not used more than once in the same bank.

What is claimed is:

1. In a switching system, a plurality of lines, means including a line finder and a selector switch for connecting a calling with a called line, both said line finder and switch having first sets of contacts in which lines terminate and a second set of contacts cooperating therewith, switching means for applying potentials to corresponding contacts of said first sets, a register comprising potential comparing means having two input circuits and operable when two potentials simultaneously applied to the different input circuits thereof bear a predetermined relationship to one another, means under control of the calling line and successively operable in selecting stages for applying different local potentials to one input circuit of said comparing means, a circuit established during a first selecting stage for connecting the potentials on the corresponding contacts of the first sets of the line finder to the other input circuit of said comparing means via one contact of the second set of contacts of said line finder, means in said line finder for causing it to seize a first set of contacts when the potential applied to the comparing means from said last-mentioned set via the last-mentioned circuit bears a predetermined relationship to the local potential applied thereto during the first selecting stage, a circuit established during a second selecting stage for connecting the potentials on corresponding contacts of the first sets of contacts of the selector switch to the other input circuit of the said comparing means via one contact of the second set of contacts of said selector switch, and means in the selector for causing it to seize a first set of contacts of the selector switch when the potential applied to the comparing means from said last-mentioned set via the last-mentioned circuit bears a predetermined relationship to the local potential applied to the first input circuit thereof during said second selecting stage.

2. In a switching system, a plurality of lines, means including a line finder, intermediate and final selector switches for establishing in successive selecting stages a connection from the calling to the called line, each line finder and switch having line terminals and wipers cooperating therewith, switching means for applying potentials to corresponding terminals of said line finder and said switches, a register comprising potential comparing means having two input circuits and operable when two potentials simultaneously applied to the input circuits thereof bear a predetermined relationship to one another, means successively operable in stages corresponding to said selecting stages for applying different local potentials to one input circuit of said comparing means depending on the terminal to be selected during each stage, a circuit established during the first selecting stage for connecting the potentials on the corresponding terminals of the line finder to the other input circuit of the comparing means via a wiper of the line finder, means in the line finder for causing it to seize a set of terminals when the potential applied to the comparing means from said last-mentioned set via the last-mentioned circuit bears a predetermined relationship to the local potential applied thereto during the first selecting stage, a circuit established during successive selecting stages for connecting the potentials on the corresponding terminals of the selector switch operated during that stage to the other input circuit of the comparing means via a wiper of the corresponding selector, and means in each selector for causing it to seize terminals engaged by its wipers when the potential applied to the comparing means from said last-mentioned terminals via the last-mentioned circuit bears a predetermined relationship to the local potential applied thereto during the corresponding selecting stage.

3. The switching system according to claim 2, and a second line finder in series with said line finder, a circuit established during the second selecting stage for connecting the potentials on the terminals of the second line finder to the other input circuit of the comparing means via a wiper of the second line finder, means in the second line finder for causing it to seize terminals of the first line finder when the potential applied to the comparing means from said last-mentioned terminals via the last-mentioned circuit bears a predetermined relationship to the local potential applied thereto during the corresponding selecting stage.

4. In a telephone exchange system, a plurality of numerically designated lines, a plurality of numerically designated groups of trunks, a connection between a calling and a called line, including a plurality of trunks, brushes and terminals of successively operated switches comprising a line finder, a first group selector, a plurality of other group selectors and a final selector, said finder and selectors having identical terminal banks, brushes and magnets, one magnet being provided for controlling the movement of the brushes of each switch over its terminal banks, two relays associated with the line finder and selector for controlling the circuits thereof, the construction of said two relays being the same in the finder and each selector, a special relay associated with each final selector and controlling connections to its brushes, and common means for controlling said operations of the group selectors in accordance with one digit and the final selector in accordance with two digits of the called number.

5. The system according to claim 4, and in which said special relay is connected between the penultimate and final selectors and contacts for said special relay controlling the circuits of the final selector relays.

6. In an automatic telephone exchange system, a plurality of lines, means including a numerically operable selector switch for establishing a connection between a calling and a called line, said selector having a bank of terminals and a set of cooperating brushes, a magnet for controlling the movement of said brushes with respect to said terminals, a first and a second relay individual to the selector and controlling the operation of said magnet, circuits for said relays controlled by the calling line and a locking circuit for one of said relays controlled by the called line.

7. In an automatic telephone exchange system, a plurality of lines, means including a final selector for establishing a talking connection between a calling and a called line, said selector having a bank of terminals and a cooperating set of brushes, a magnet for controlling the movement of said brushes with respect to said terminals, a first and a second relay individual to the selector, energizing circuits for said relays controlled by the calling line, a locking circuit for the second relay controlled by the calling line, a second locking circuit for the second relay controlled by the called line over a conductor of the talking connection, an energizing circuit for the magnet controlled by both relays, and a second energizing circuit for the magnet controlled solely by the second relay.

8. The system according to claim 7, and a time alarm device for opening said second locking circuit a predetermined length of time after its closure.

9. In an automatic telephone exchange system, a plurality of lines, means including a final selector for connecting a calling with a called line, said selector having a bank of terminals and a set of cooperating brushes, a magnet for controlling the movement of said brushes with respect to said terminals, a first, a second and a third relay individual to the selector, energizing circuits for said relays controlled by the calling line, a locking circuit for the second relay including front contacts of the third relay and controlled by the calling line, a second locking circuit for the second relay including back contacts of the third relay and controlled by the called line, and energizing circuit for the magnet controlled by front contacts of the first and second relays, and a second energizing circuit for the magnet controlled by back contacts of the second relay.

10. The system according to claim 9, and a time alarm device for opening said second locking circuit a predetermined length of time after its closure.

11. The system according to claim 9, and in which the energizing circuit of the second relay is controlled by the third relay.

12. The system according to claim 9, and in which the talking connection includes contacts of said third relay.

13. In a telephone exchange system, a plurality of lines divided into groups, means including numerically operable selector switches for establishing a connection between a calling and a called line, a register operable in accordance with the numerical designation of the called line for controlling the operation of said selector switches, a plurality of groups of first non-numerical switches, each group assigned to a particular group of lines, a plurality of second non-numerical switches, each assigned to different groups of first non-numerical switches, means controlled by the register for selecting a second non-numerical switch assigned to the group of first non-numerical switches which is assigned to the calling line, and means for operating the selected first and second non-numerical switches for connecting the calling line to the register and selector switches.

14. In a telephone exchange system, a plurality of lines divided into groups, means including a plurality of groups of numerically operable selector switches for establishing a connection between a calling and a called line, a register operable in accordance with the numerical designation of the called line for controlling the operation of said selector switches, a plurality of groups of first line finders, each group having access to a different group of lines, a plurality of groups of second line finders each group connected with a different group of selectors and having access to a plurality of groups of first line finders, means controlled by the register for selecting a second line finder which has access to a first line finder having, in turn, access to the calling line, and means for operating the selected first line finder to connect the calling line through the second line finder with the register and a selector.

15. In a telephone exchange system, two groups of lines, means including two groups of numerically operable selectors for establishing a connection between a calling and a called line, a plurality of registers variably operable in accordance with the called number to control the operation of selectors, two groups of links, switching means for each link to connect a selector of the corresponding group with a register, means responsive to the initiation of a call on a line for starting the switching means of all idle links of the group corresponding to that of the calling line, two groups of non-numerical switches adapted to connect the links of said groups with the corresponding groups of calling lines, a switching device for each group of lines to select the group of links corresponding to the group of the calling line, and means operative upon the connection of a register with a selector over a link for operating a switching device to connect the last-mentioned link with the calling line.

16. In a telephone exchange system, two groups of lines, means including two groups of numerically operable selectors for establishing a connection between a calling and a called line, a plurality of registers variably operable in accordance with the called number to control the operation of said selectors, two groups of links, a normally inactive first finder for each link adapted to select a selector of the corresponding group, a normally inactive second finder for each link adapted to select a register, means responsive to the initiation of a call on a line for starting the first finders of all idle links of the group corresponding to that of the calling line, means operative upon the selection of a first selector for starting the second finder of the same link to select a register, two groups of line finders adapted to connect the links of said groups with the corresponding groups of calling lines, a first and a second chooser switch adapted to select the group of links corresponding to the group of the calling line, and means operative upon the connection of a register with a selector over a link for operating a chooser switch to connect the last-mentioned link with the calling line.

17. In a multi-potential control system for telephone exchanges, a plurality of lines divided into groups, a source of direct current potential, means for applying characteristic potentials to said lines identifying their calling and non-calling condition and potentials identifying their groups, means including a first and a second line finder and a numerically operable selector for establishing a connection between a calling line and a called line, a register including an electrical discharge device controlling the operation of said finders and selector, means responsive to the initiation of a call for applying to said discharge device at the register a calling line potential, and a switch for applying to said device the calling group potential while it controls the second line finder.

18. In a telephone exchange system, a plurality of lines, means including groups of first and second non-numerical switches and numerical selector switches for establishing connections between calling and called lines, a plurality of registers operable over calling lines in accordance with the numerical designation of the called line and arranged to control the operations of said selectors, switching means operable upon the initiation of a call on a line for selecting a register, one of a group of second non-numerical switches and one of a group of selectors, and connecting the selected register with the selected switches, means operative thereupon for actuating the selected second switch to select a first non-numerical switch and the latter to select the calling line and connect it with the register, and means operative upon the selection of the calling line by a first switch for releasing said switching means.

19. In a telephone exchange system, a plurality of lines, means including groups of first and second line finder switches and numerical selector switches for establishing connections between calling and called lines, a plurality of registers operable over calling lines in accordance with the numerical designation of the called line and arranged to control the operations of said selectors, switching means operable upon the initiation of a call on a line for selecting a register, one of a group of second line finders and one of a group of selectors, and connecting the selected register with the selected switches, means operative thereupon for actuating the selected second line finder to select a first line finder and the latter to select the calling line and connect it with the register, and means operative upon the selection of the calling line by a first line finder for releasing said switching means.

GERALD DEAKIN.

REFERENCES CITED

The following references are of record in the file of this patent:

UNITED STATES PATENTS

| Number | Name | Date |
| --- | --- | --- |
| 1,688,162 | Stehlik | Oct. 16, 1928 |
| 1,857,833 | Baker | May 10, 1932 |
| 1,925,264 | Lomax | Sept. 5, 1933 |
| 1,990,644 | Friendly | Feb. 12, 1935 |
| 2,224,477 | Herrick | Dec. 10, 1940 |
| 2,227,488 | Collis et al. | Jan. 7, 1941 |
| 2,235,803 | Carpenter | Mar. 18, 1941 |
| 2,355,908 | Dehn | Aug. 15, 1944 |

OTHER REFERENCES

Automatic Telephony, second edition, by Smith and Campbell, page 9.